United States Patent
Tomita et al.

(10) Patent No.: US 8,842,213 B2
(45) Date of Patent: Sep. 23, 2014

(54) IMAGE CAPTURE DEVICE, IMAGE CAPTURE DEVICE FOCUS CONTROL METHOD, AND INTEGRATED CIRCUIT

(75) Inventors: Hiroto Tomita, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 13/882,837

(22) PCT Filed: Apr. 17, 2012

(86) PCT No.: PCT/JP2012/002651
§ 371 (c)(1),
(2), (4) Date: May 1, 2013

(87) PCT Pub. No.: WO2012/144195
PCT Pub. Date: Oct. 26, 2012

(65) Prior Publication Data
US 2013/0215319 A1  Aug. 22, 2013

(30) Foreign Application Priority Data
Apr. 18, 2011  (JP) ................. 2011-092355

(51) Int. Cl.
| | |
|---|---|
| *H04N 5/232* | (2006.01) |
| *G03B 3/10* | (2006.01) |
| *G02B 7/36* | (2006.01) |
| *G06K 9/62* | (2006.01) |
| *G06T 1/00* | (2006.01) |
| *G03B 15/00* | (2006.01) |
| *G02B 7/28* | (2006.01) |
| *G03B 13/36* | (2006.01) |

(52) U.S. Cl.
CPC .......... *G06K 9/6201* (2013.01); *H04N 5/23219* (2013.01); *G02B 7/36* (2013.01); *H04N 5/23212* (2013.01); *G06T 1/00* (2013.01); *G03B 15/00* (2013.01); *G02B 7/28* (2013.01); *H04N 5/232* (2013.01); *G03B 13/36* (2013.01)

USPC .......................... 348/354; 348/345; 396/122

(58) Field of Classification Search
USPC ................... 348/345–357; 396/122
See application file for complete search history.

(56) References Cited

U.S. PATENT DOCUMENTS 7,889,985 B2 * 2/2011 Misawa et al. ............... 396/122
8,077,252 B2 * 12/2011 Fukugawa et al. ........... 348/354
(Continued)

FOREIGN PATENT DOCUMENTS

| JP | 2003-131115 | 5/2003 |
|---|---|---|
| JP | 2007-81682 | 3/2007 |

(Continued)

OTHER PUBLICATIONS

International Search Report issued Jun. 12, 2012 in International (PCT) Application No. PCT/JP2012/002651.

(Continued)

*Primary Examiner* — Tuan Ho
*Assistant Examiner* — Selam Gebriel
(74) *Attorney, Agent, or Firm* — Wenderoth, Lind & Ponack, L.L.P.

(57) ABSTRACT

The stability is improved with which focus control is performed by an image capture device that brings a face region image into focus according to the contrast method. A human detection circuit 3 performs a human image search by using a threshold value Thh1. A face detection circuit 2 performs a face image search by using a threshold value Thf1. When an entire body image region corresponding to an entire body of a person is detected and a face image region corresponding to a face of the same person is detected in the captured image through the human image search and the face image search, the face detection circuit 2 performs redetermination with respect to the face image region by using a threshold value Thf2. The redetermination by using the threshold value Thf21 has higher accuracy compared to the face image search by using the threshold value Thf1.

16 Claims, 23 Drawing Sheets

(56) References Cited

U.S. PATENT DOCUMENTS

| | | |
|---|---|---|
| 2007/0263997 A1 | 11/2007 | Hirai et al. |
| 2010/0002128 A1 | 1/2010 | Ishii |
| 2010/0053358 A1 | 3/2010 | Kodama |
| 2010/0188560 A1 | 7/2010 | Sakai et al. |
| 2010/0208127 A1 | 8/2010 | Takada et al. |

FOREIGN PATENT DOCUMENTS

| | | |
|---|---|---|
| JP | 2007-304280 | 11/2007 |
| JP | 2008-70640 | 3/2008 |
| JP | 2009-81714 | 4/2009 |
| JP | 2010-14883 | 1/2010 |
| JP | 2010-15024 | 1/2010 |
| JP | 2010-56692 | 3/2010 |
| JP | 2010-72723 | 4/2010 |
| JP | 2010-109671 | 5/2010 |
| JP | 2010-186004 | 8/2010 |
| JP | 2010-199903 | 9/2010 |
| JP | 2010-244089 | 10/2010 |
| JP | 2011-35765 | 2/2011 |
| WO | 2010/073619 | 7/2010 |

OTHER PUBLICATIONS

Tomoki Watanabe et al., "Co-occurrence Histograms of Oriented Gradients for Pedestrian Detection", PSIVT 2009, pp. 37-47, 2009.

\* cited by examiner

Face detection results

| i | Existence/<br>non-existence | Position | Size | Direction/<br>inclination | Evaluation<br>value |
|---|---|---|---|---|---|
| 0 | 1 | 128, 48 | 32 | Facing<br>front | 10 |

Human detection results

| j | Existence/<br>non-existence | Position | Size | Direction/<br>inclination | Evaluation<br>value |
|---|---|---|---|---|---|
| 0 | 1 | 128, 128 | 100 × 200 | Facing<br>front | 15 |
| 1 | 1 | 256, 104 | 80 × 160 | Facing<br>sideways | 12 |

FIG.9

| Range of size [pixels] | Size group |
|---|---|
| 24 ~ 29 | 0 |
| 29 ~ 35 | 1 |
| 35 ~ 41 | 2 |
| 41 ~ 50 | 3 |
| 50 ~ 60 | 4 |
| 60 ~ 72 | 5 |
| 72 ~ 86 | 6 |
| 86 ~ 103 | 7 |
| 103 ~ 124 | 8 |
| 124 ~ 149 | 9 |
| 149 ~ 178 | 10 |
| 178 ~ 214 | 11 |
| 214 ~ 240 | 12 |

FIG.10A

Face detection results

| i | Existence non-existence | Position | Size | Direction/ inclination | Evaluation value |
|---|---|---|---|---|---|
| 0 | 1 | 128, 48 | 32 | Facing front | 10 |
| — | 0 | — | — | — | — |
| — | 0 | — | — | — | — |

FIG.10B

Human detection results

| j | Existence non-existence | Position | Size | Direction/ inclination | Evaluation value |
|---|---|---|---|---|---|
| 0 | 1 | 128, 128 | 100 × 200 | Facing front | 15 |
| 1 | 1 | 256, 104 | 80 × 160 | Facing sideways | 12 |
| — | 0 | — | — | — | — |

FIG.10C

Aggregated detection results

| Group | Existence non-existence | Position | Size | Direction/ inclination | Evaluation value |
|---|---|---|---|---|---|
| 0 | 1<br>1 | 128, 48<br>128, 128 | 32<br>100 × 200 | Facing front<br>Facing front | 10<br>15 |
| 1 | 0<br>1 | —<br>256, 104 | —<br>80 × 160 | —<br>Facing backwards | —<br>12 |
| — | 0<br>0 | —<br>— | —<br>— | —<br>— | —<br>— |

Upper row: face detection results
Lower row: human detection results

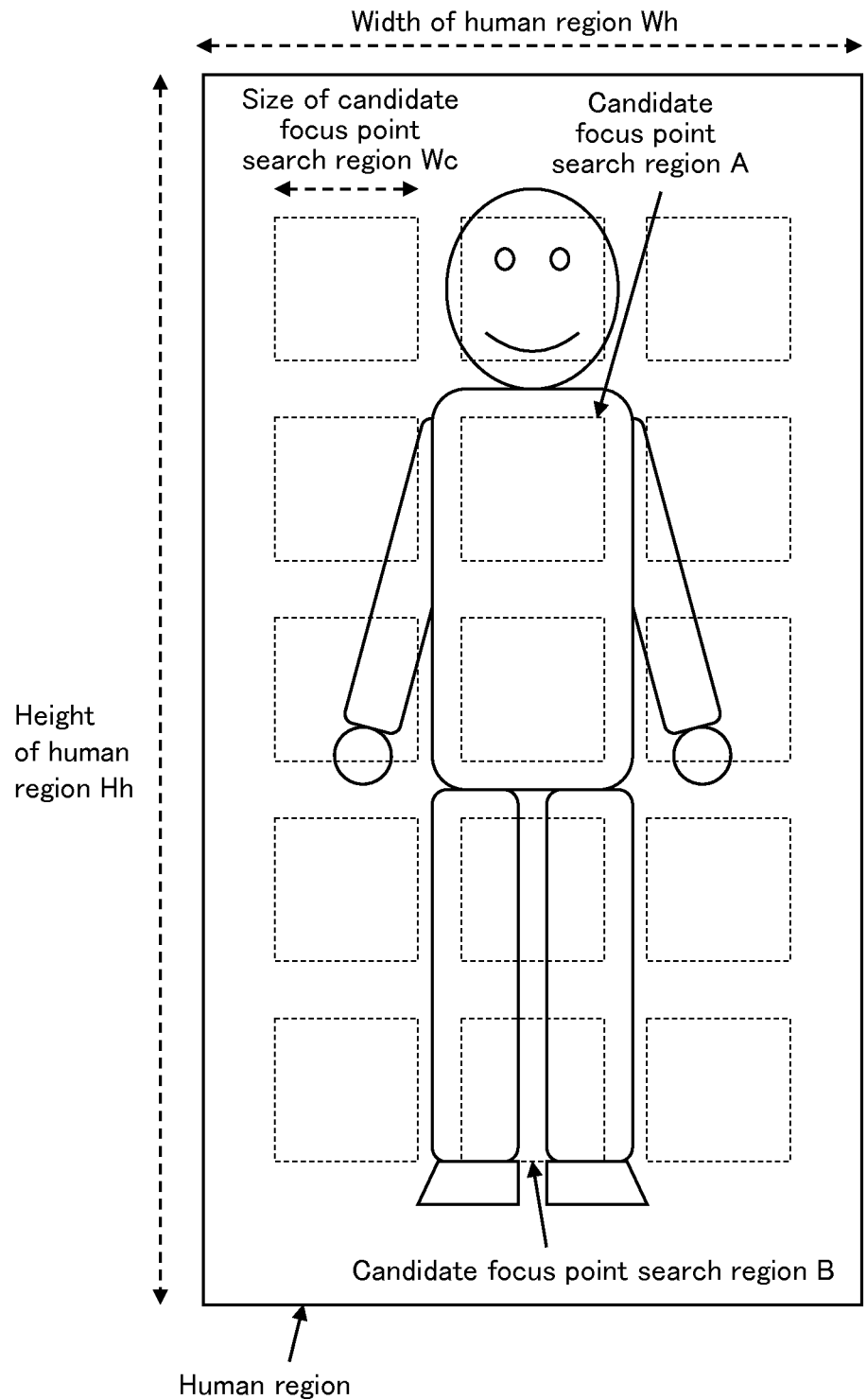

FIG.20A

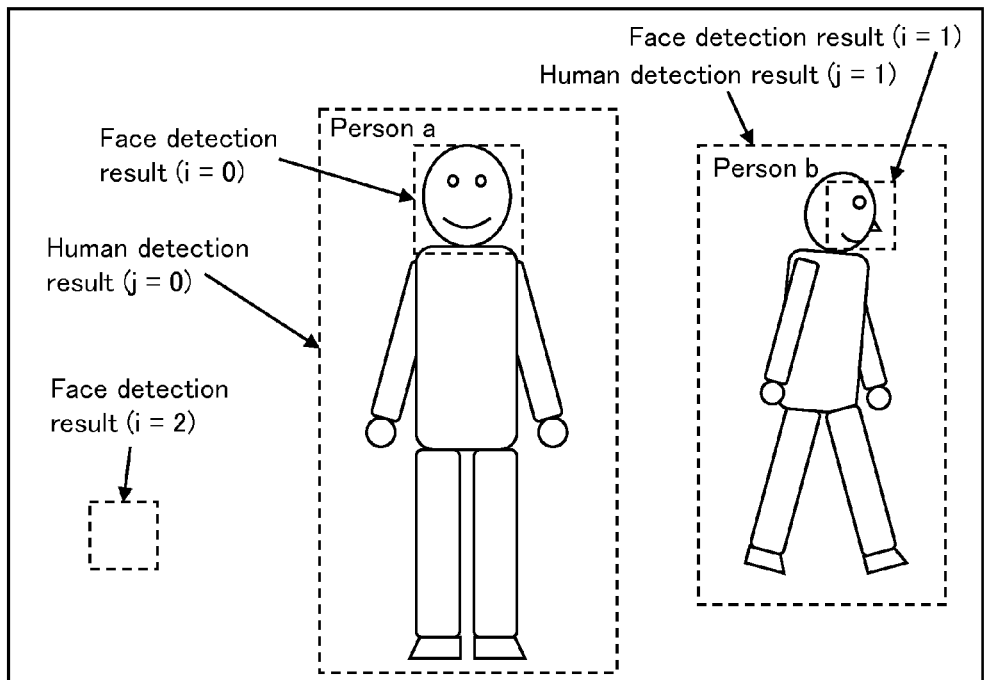

Captured image

FIG.20B

Face detection results

| i | Existence/ non-existence | Position | Size | Direction/ inclination | Evaluation value |
|---|---|---|---|---|---|
| 0 | 1 | 128, 48 | 32 | Facing front | 10 |
| 1 | 1 | 264, 56 | 28 | Facing right | 4 |
| 2 | 1 | 32, 176 | 24 | Facing front | 3 |

Human detection results

| i | Existence/ non-existence | Position | Size | Direction/ inclination | Evaluation value |
|---|---|---|---|---|---|
| 0 | 1 | 128, 128 | 100 × 200 | Facing front | 15 |
| 1 | 1 | 256, 104 | 80 × 160 | Facing right | 12 |

Aggregated detection results

| Group | Existence/ non-existence | Position | Size | Direction/ inclination | Evaluation value |
|---|---|---|---|---|---|
| 0 | 1<br>1 | 128, 48<br>128, 128 | 32<br>100 × 200 | Facing front<br>Facing front | 10<br>15 |
| 1 | 1<br>1 | 264, 56<br>256, 104 | 28<br>80 × 160 | Facing right<br>Facing right | 4<br>12 |
| 2 | 1→0<br>0 | 32, 176<br>— | 24<br>— | Facing front<br>— | 3<br>— |

FIG.22A

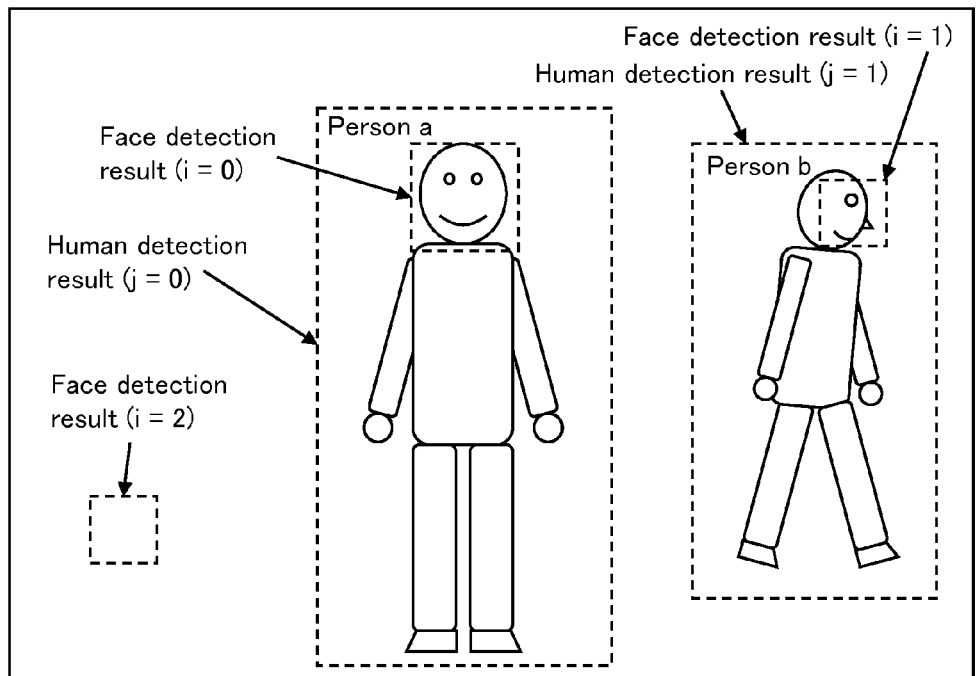

Captured image

FIG.22B

Face detection results

| i | Existence/non-existence | Position | Size | Direction/inclination | Evaluation value |
|---|---|---|---|---|---|
| 0 | 1 | 128, 48 | 32 | Facing front | 10 |
| 1 | 1 | 264, 56 | 28 | Facing right | 4 |
| 2 | 1 | 32, 176 | 24 | Facing front | 3 |

Human detection results

| i | Existence/non-existence | Position | Size | Direction/inclination | Evaluation value |
|---|---|---|---|---|---|
| 0 | 1 | 128, 128 | 100 × 200 | Facing front | 15 |
| 1 | 1 | 256, 104 | 80 × 160 | Facing right | 12 |

Aggregated detection results

| Group | Existence/non-existence | Position | Size | Direction/inclination | Evaluation value |
|---|---|---|---|---|---|
| 0 | 1<br>1 | 128, 48<br>128, 128 | 32<br>100 × 200 | Facing front<br>Facing front | 10<br>15 |
| 1 | 1→0<br>1 | 264, 56<br>256, 104 | 28<br>80 × 160 | Facing right<br>Facing right | 4<br>12 |
| 2 | 1→0<br>0 | 32, 176<br>— | 24<br>— | Facing front<br>— | 3<br>— |

IMAGE CAPTURE DEVICE, IMAGE CAPTURE DEVICE FOCUS CONTROL METHOD, AND INTEGRATED CIRCUIT

TECHNICAL FIELD

The present invention relates to a technology of controlling focus of an image capture device such as a digital still camera and a video camera, and in particular, to a technology of bringing a photographic object into focus according to the contrast method.

BACKGROUND ART

According to the so-called "contrast method", focus control is performed based on a contrast of a region in a captured image that is to be brought into focus (hereinafter referred to as a "focus point search region"). More specifically, according to the contrast method, a focus lens is determined as being in an in-focus state when the contrast of the focus point search region becomes highest. In the meantime, there are many image capture devices that are provided with a face detection function of detecting a region including a person's face in a captured image. Such image capture devices set the region detected by face detection as the focus point search region in the captured image, and obtain a captured image that is appropriate in the sense that the person's face is brought into focus by performing focus control according to the contrast method.

Face detection, however, is a technology of capturing characteristic features of a person's eye, nose, mouth, etc. As such, generally speaking, only faces facing a limited range of directions in a captured image can be detected according to face detection. For instance, a face of a person facing backwards in a captured image or a face of a person facing sideways such that his/her eyes are hidden in a captured image cannot be detected by utilizing face detection. As such, in a case where a moving image is being shot while the focus point is being set to a person, for instance, face detection of the person's face fails when the person faces backwards in the midst of the shooting. This results in unstable focus (i.e., a state where the point in a captured image keeps changing unstably and the focus lens cannot be kept in the in-focus state). Similarly, when a person enters an image-capturing frame of an image capture device from outside the frame while a moving image is being shot, the focus point is not set to the person until the person turns his/her face towards the image capture device.

Patent Literature 1 discloses a technology for preventing unstable focus. According to the technology disclosed in Patent Literature 1, focus control is performed according to the contrast method when a person's face is detected by face detection. On the other hand, when a person's face is not detected, focus control is performed according to the so-called phase difference detection method while limiting the range of focus control such that a background, etc., of a captured image is not brought into focus, or in other words, such that the focus point is not set to the background, etc. Suppose a case where a face that is first being stably detected later becomes temporarily undetected, and focus control is performed according to the phase difference detection method from the point when the face becomes undetected. In such a case, when a focus point whose distance is measured according to the phase difference detection method corresponds to a background, etc., of a captured image and is not in close proximity of a focus point having been set while focus control was being performed according to the contrast method, the technology disclosed in Patent Literature 1 limits the range within which focus control can be performed according to the phase difference detection method so as to prevent unstable focus.

Patent Literature 2 discloses a technology of detecting a region in a captured image corresponding to a person (hereinafter referred to as a human region), and assuming that a region in the human region indicated by region specification information is a region in the captured image corresponding to a face of the person. Here, the region specification information is predetermined information indicating a relative position and a relative size of a face portion in a human region. One example of a technology usable in the detection of a human region (hereinafter referred to as "human detection") is disclosed in Non-Patent Literature 1. Non-Patent Literature 1 discloses capturing a shape of a person by using a characteristic feature indicating image characteristics obtained by concatenating histogram representations of edge gradients in the image. This allows, for instance, detection of a person facing backwards. In addition, since a characteristic feature is calculated for each block according to the technology disclosed in Non-Patent Literature 1, local changes in the shape of the person are tolerated, and as a result, changes in the person's posture are tolerated to a certain extent. By performing human detection according to such a technology, a region in a captured image corresponding to a person can be detected regardless of which direction the person's face is facing in the captured image.

CITATION LIST

Patent Literature

[Patent Literature 1]
Japanese Patent Application Publication No. 2010-015024
[Patent Literature 2]
Japanese Patent Application Publication No. 2010-199903

Non-Patent Literature

[Non-Patent Literature 1]
Tomoki Watanabe, "Co-occurrence Histograms of Oriented Gradients for Pedestrian Detection," PSIVT 2009, pp. 37-47, 2009.

SUMMARY OF INVENTION

Technical Problem

In order to realize focus control according to the phase difference detection method utilized in the technology disclosed in Patent Literature 1, a sensor for detecting a focal distance is separately required in addition to an imaging sensor. This makes downsizing of a camera difficult, and as a result, the technology disclosed in Patent Literature 1 is applicable to only limited types of cameras such as a single lens reflex camera, etc., while difficulty lies in the application of the same technology to compact cameras due to the internal device space within compact cameras being limited.

In addition, so as to perform human detection with a practical degree of accuracy, robustness is required such that a change in a person's posture is tolerated to a certain degree as in the technology disclosed in Non-Patent Literature 1. Due to this, it is difficult to realize stable detection of a face region in a captured image by using the predetermined information as described above, which indicates a relative position and a relative size of a face portion relative to a human region. Hence, when applying the technology disclosed in Patent Literature 2, depending upon a posture of a person in a captured image, there are cases where a background is included covering a large proportion of a region in the captured image assumed as being a face region. In such cases, there is a risk of unstable focus, which includes a state where the focus point is set to the background.

In view of the problems discussed above, the present invention provides an image capture device that improves stability of focus control when focusing is performed according to the contrast method.

Solution to the Problems

One aspect of the present invention is an image determination device that searches for an image of a person in a captured image, comprising: a search unit that searches for a set of a first region and a second region in the captured image according to a predetermined search condition, the first region potentially including a photographic object image that corresponds to an entire body of a person and the second region potentially including a partial image that corresponds to a predetermined body part of the person; and a determination unit that determines whether or not the search by the search unit according to the predetermined search condition is successful, wherein when the determination unit determines that the search by the search unit is successful, the search unit performs a redetermination, with respect to at least one of the first region and the second region found through the search by the search unit and pertaining to the same person, of determining whether or not the at least one of the first region, which potentially includes the photographic object image, and the second region, which potentially includes the partial image, includes the corresponding image, and an accuracy of the search by the search unit differs from an accuracy of the redetermination by the search unit.

Advantageous Effects of the Invention

According to the above-described structure of the image capture device pertaining to one aspect of the present invention, different, appropriate search conditions are applied in the search for a set of the first region and the second region pertaining to the same person and in the redetermination, following the search, where a determination is made whether or not the at least one of the first region and the second region actually includes the corresponding search-target image. Since the image capture device pertaining to one aspect of the present invention searches for a set of the first region and the second region, cases where a person appearing in the captured image is not detected are prevented. At the same time, since the image capture device pertaining to one aspect of the present invention performs the redetermination of whether or not the at least one of the first region and the second region actually includes the corresponding search-target image, even in cases where a region not actually including the search-target image is detected in the search for a set of the first region and the second region, such a region is excluded as a result of the redetermination. As such, the image capture device pertaining to one aspect of the present invention improves the accuracy with which a person and a face that appear in a captured image are actually detected. The improvement of the accuracy with which a person and a face appearing in a captured image are actually detected leads to stabilization of the focus point search region, which further results in unstable focus control being suppressed.

BRIEF DESCRIPTION OF THE DRAWINGS

FIG. 9 illustrates a relation between sizes of face regions in aggregated detection results and size groups.

FIG. 10A illustrates face detection results, FIG. 10B illustrates human detection results, and FIG. 10C illustrates aggregated detection results.

FIG. 11 is a diagram for explaining candidate focus point detection regions set within a human region.

FIGS. 20A and 20B illustrate face detection results, human detection results, and aggregated detection results.

FIGS. 22A and 22B illustrate face detection results, human detection results, and aggregated detection results in embodiment 5.

DESCRIPTION OF EMBODIMENTS

In the following, description is provided on embodiments of the present invention, with reference to the accompanying drawings.

Embodiment 1

Figure 1:
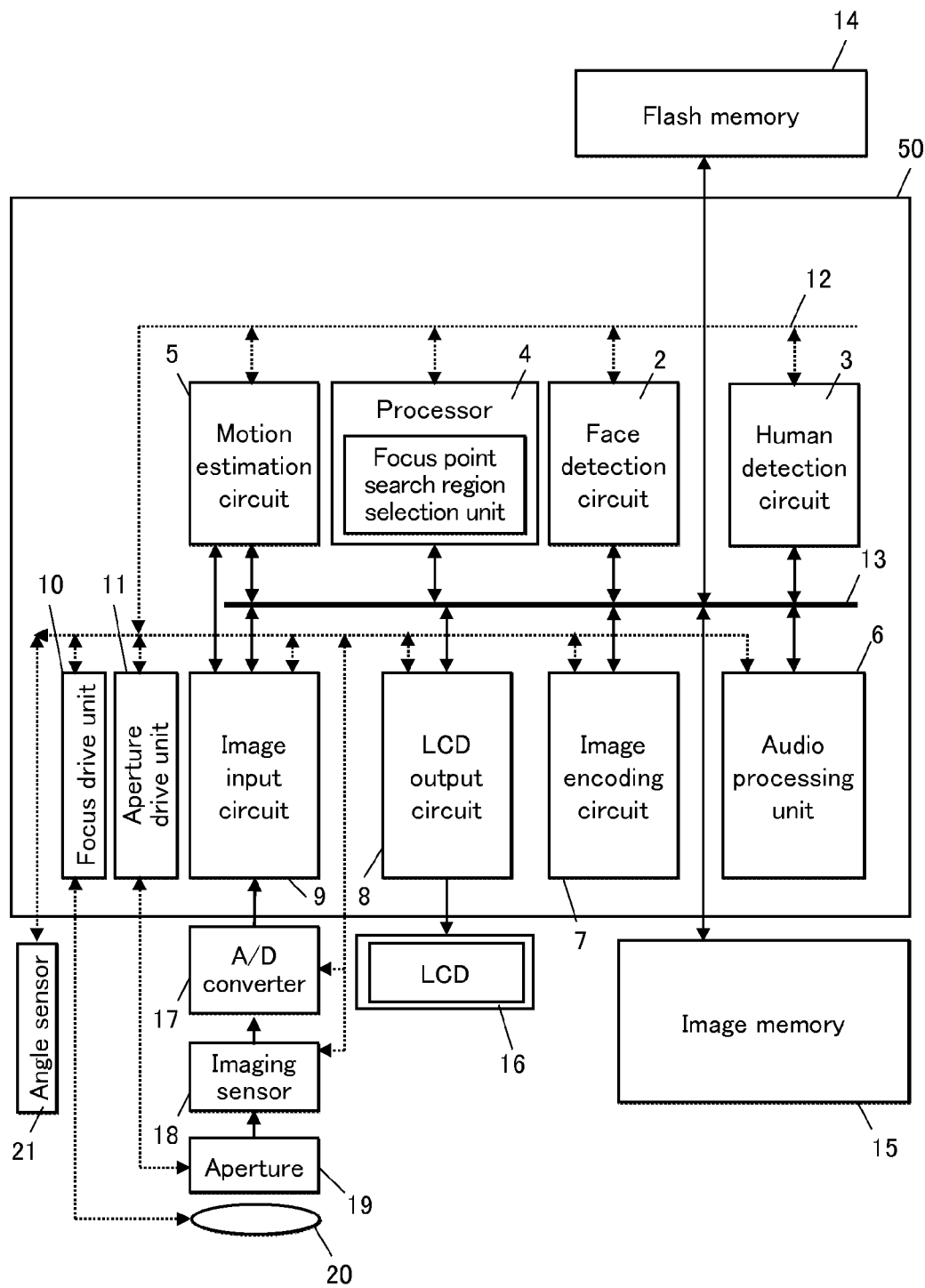
FIG. 1 is a block diagram illustrating an image capture device pertaining to embodiment 1.

FIG. 1 illustrates a structure of an image capture device pertaining to embodiment 1 of the present invention. An image capture device 1 illustrated in FIG. 1 is a digital still camera, and includes: a face detection circuit 2; a human detection circuit 3; a processor 4; a motion estimation circuit 5; an audio processing unit 6; an image encoding circuit 7; an LCD output circuit 8; an image input circuit 9; a focus drive unit 10; an aperture drive unit 11; an internal I/O bus 12; a memory bus 13; a flash memory 14; an image memory 15; a liquid crystal display (LCD) 16; an A/D converter 17; an imaging sensor 18; an aperture 19; a focus lens 20; and an angle sensor 21.

The focus lens 20 and the aperture 19 constitute an imaging optical system. The focus lens 20, by being controlled by the focus drive unit 10, is moveable along an optical axis direction. The aperture 19, by being controlled by the aperture drive unit 11, adjusts light amount. In addition, the image capture device 1, although not illustrated in FIG. 1, may further include a zoom lens, a shutter, etc., which constitute the imaging optical system along with the focus lens 20 and the aperture 19.

The imaging sensor 18 is a photoelectric conversion element implemented by a CCD sensor or a CMOS sensor. The imaging sensor 18 captures an image of a photographic object formed by the imaging optical system and outputs an image signal.

The A/D converter 17 is a converter that converts the image signal output from the imaging sensor 18, which is an analog signal, into a digital signal. Digital data output from the A/D converter 17 is input to the image input circuit 9.

The image input circuit 9 performs pixel interpolation processing and/or color conversion processing with respect to the digital data input from the A/D converter 17 and thereby generates an image signal of a captured image. A combination of the imaging sensor 18, the A/D converter 17, and the image input circuit 9 realize a function as an imaging unit that generates a captured image by capturing an optical image formed by the imaging optical system. The image signal generated by the image input circuit 9 is output to the image memory 15. In addition, the image input circuit 9 also performs, according to a luminance value of a specified region in the captured image, a calculation of a value indicating an in-focus state of the photographic object (i.e., uses an image contrast value as an AF evaluation value) and a calculation of a value indicating the brightness of the photographic object (i.e., uses an image brightness value as an AF evaluation value).

The processor 4, by executing programs, functions as an arithmetic processing device and a control device. More specifically, the processor 4 controls processing performed by each of the constituent elements included in the image capture device 1 by reading out and executing programs stored onto the flash memory 14. By executing the programs, the processor 4 functions, for instance, as a focus control unit that calculates an in-focus position of the focus lens 20 according to the image contrast value obtained from the image input circuit 9 and an aperture control unit that calculates an aperture value of the aperture 19 according to the image brightness value. The processor 4, according to the values yielded through such calculations, outputs a control signal to the focus drive unit 10 and/or the aperture drive unit 11, and thereby controls the imaging optical system. Note that, although only one processor, namely the processor 4, is included in the present embodiment, in another embodiment of the present invention, a plurality of processors may be included.

The image encoding circuit 7 receives an unencoded image signal and performs encoding processing with respect to the image signal. Here, the encoding formats according to which the image encoding circuit 7 performs the encoding processing may be, for instance, the JPEG format in the case of a still image, and may be the MPEG or the H.264 format in the case of a moving image. The image encoding circuit 7 outputs the encoded data to the image memory 15 and/or an external recording medium.

The LCD output circuit 8 is an image display unit that receives image data output to the image memory 15 from the image input circuit 9, and displays an image on the LCD 16. More specifically, the LCD output circuit 8 displays an image prior to shooting of a picture (i.e., a captured image) stored in the image memory 15 and in addition, displays various settings of the image capture device 1. In addition, the LCD output circuit 8 also displays, for instance, a frame for clearly indicating a photographic object detected by the face detection circuit 2 and the human detection circuit 3, detailed description of which is provided in the following. For instance, the LCD output circuit 8 displays a frame clearly indicating a face region detected by the face detection circuit 2 by adjusting a position and a size of the frame in accordance with a position and a size of the face region and by overlaying the frame onto the face region of an image. In addition to the above, the LCD output circuit 8 also functions as a focus point search region display unit that displays, by overlaying on an image, a frame indicating a focus point search region that has been brought into focus by the processor 4 performing focus control using the contrast value.

The LCD 16 is a display device for displaying a captured image. Note that, although an LCD is used as the display device in the present embodiment, in another embodiment of the present invention, a different type of display device (e.g., an organic EL display) may be included.

The face detection circuit 2 functions as a search unit that obtains a captured image stored in the image memory 15 and detects, in the captured image, a face region including a face image (such detection hereinafter referred to as "face detection"). The result of the face detection by the face detection circuit 2 is notified to the processor 4 as a candidate focus point search region to be used in the focus control processing.

The human detection circuit 3 functions as a search unit that obtains a captured image stored in the image memory 15 and detects, in the captured image, a human region including a human image (such detection hereinafter referred to as "human detection"). The result of the human detection by the human detection circuit 3 is notified to the processor 4 as a candidate focus point search region to be used in the focus control processing.

The motion estimation unit 5 obtains a result of the human detection from the human detection circuit 3 every time a predetermined time period elapses and calculates a speed of movement of a person over time according to a change in a size and a position of a human region.

This concludes description on the structure of the image capture device 1.

In the following, description is provided on each type of processing executed by the image capture device 1.

<Face Detection>

Figure 2:
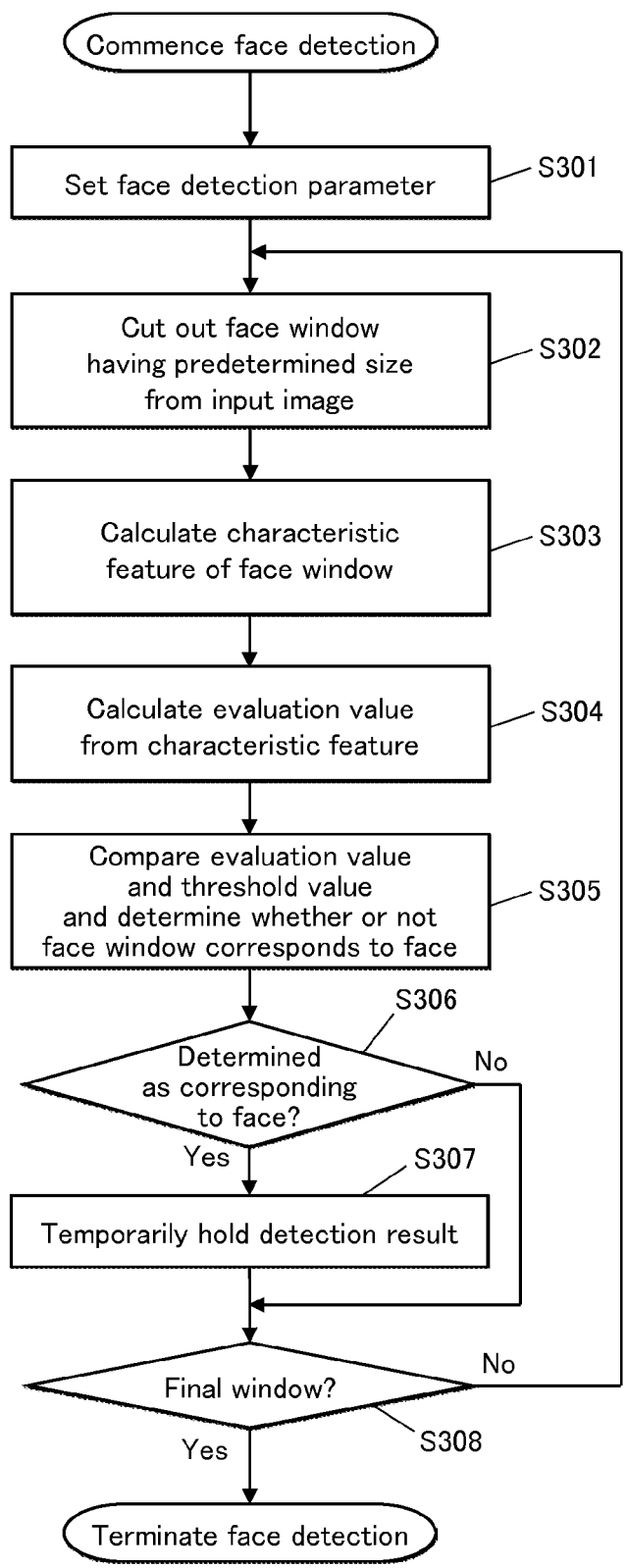
FIG. 2 is a flowchart illustrating procedures involved in face detection.

First, description is provided on a flow of processing of the face detection performed by the face detection circuit 2, with reference to FIG. 2. In the face detection, the face detection circuit 2 first receives, from the processor 4, a face detection parameter serving as a threshold value when determining whether or not a captured image includes an image of a person's face (Step S301). The face detection circuit 2 controls operations following this point according to the face detection parameters. Following Step S301, the face detection circuit 2 reads a captured image stored in the image memory 15, and cuts out, from the captured image, a search region with respect to which the search of a face image is to be performed by using a window having a predetermined size (for instance, a size of 24×24 pixels) (Step S302). Subsequently, the face detection circuit 2 calculates a characteristic feature of the search region cut out by using the window (Step S303). One example of a characteristic feature calculated by the face detection circuit 2 is a light and shade pattern exhibited by luminance values within the search region. By learning, in advance, characteristics of a light and shade pattern of elements composing a person's face (e.g., the eyes, the nose, the mouth, and the jaw), an evaluation value that is in accordance with the light and shade pattern and that can be used for identifying whether a given image is a face image or not can be acquired. The human detection circuit 2 calculates an evaluation value by using the characteristic feature of the search region (Step S304). Then, by comparing the evaluation value with the threshold value set as the face detection parameter, the human detection circuit 2 determines whether or not the search region corresponds to a face (Step S305). When the search region is determined as corresponding to a face, the human detection circuit 2 outputs, as a face detection result, information indicating a position of the face (for instance, a central coordinate of the search region in which the face is detected), information indicating a size of the face, and information indicating a direction that the face is facing (Step S307). The human detection circuit 2 completes the face detection with respect to the entire captured image read out when the above-described processing has been performed with respect to all search regions that can be cut out from the captured image by using the window. Note that, although not illustrated in the flowchart in FIG. 2, it is desirable that similar processing be repeatedly performed with respect to several variations of the captured image that are obtained by scaling down the captured image. By performing the face detection processing with respect to scaled-down variations of the captured image, the human detection circuit 2 is able to detect face images of different sizes. Note that the face detection need not performed according to the method described above, and the face detection may be performed according to other methods.

<Human Detection>

Subsequently, description is provided on a flow of processing of the human detection performed by the human detection circuit 3, with reference to FIG. 3. In the human detection, the human detection circuit 3 first receives, from the processor 4, a human detection parameter serving as a threshold value when determining whether or not a captured image includes an image of a person (Step S401). The human detection circuit 3 controls operations following this point according to the human detection parameter. Following Step S401, the human detection circuit 3 reads a captured image stored in the image memory 15, and cuts out, from the captured image, a search region with respect to which the search of a human image is to be performed by using a window having a predetermined size (for instance, a size of 64×128 pixels) (Step S402). Subsequently, the human detection circuit 3 calculates a characteristic feature of the search region cut out by using the window (Step S403). One example of a characteristic feature calculated by the human detection circuit 3 is a histogram of edge gradients exhibited by luminance values within the search region. By learning, in advance, characteristics of a histogram of edge gradients of an outline of a person, an evaluation value that can be used for identifying whether or not a search region corresponds to a person can be acquired. The human detection circuit 3 calculates an evaluation value according to the characteristic feature of the search region (Step S404). Then, by comparing the evaluation value with the threshold value set as the human detection parameter, the human detection circuit 3 determines whether or not the search region corresponds to a person (Step S405). When the search region is determined as corresponding to a person, the human detection circuit 3 outputs, as a human detection result, information indicating a position of the person (for instance, a central coordinate of the search region in which the person is detected), information indicating a size of the person, and information indicating a direction that the person is facing (Step S407). The human detection circuit 3 completes the human detection processing with respect to the entire captured image read out when the above-described processing has been performed with respect to all search regions that can be cut out from the captured image by using the window. Note that, although not illustrated in the flowchart in FIG. 3, it is desirable that similar processing be repeatedly performed with respect to several variations of the captured image that are obtained by scaling down the captured image. By performing the human detection processing with respect to scaled-down variations of the captured image, the human detection circuit 3 is able to detect people images of different sizes.

Note that the human detection need not be performed according to the method described above, and the human detection may be performed according to other methods. In addition, the human region to be detected through the human detection is not limited to a region including an image of an entire body of a person, and may be a region including an image of an upper half of a person's body.

Here, it should be noted that a processing-target image used in the face detection and a processing-target image used in the human detection do not necessarily have to be the same image. For instance, images differing in terms of resolution may be used in the face detection and the human detection, provided that the images have been captured at the same time point or have been continuously captured with only an extremely short time period therebetween. That is, for instance, the face detection may be performed by using a low-resolution image such as a QVGA image (having a resolution of 320×240 pixels) while the human detection may be performed by using a high-resolution image such as a VGA image (having a resolution of 640×480 pixels). As a matter of course, the same image may be used for both the face detection and the human detection.

Further, although the face detection circuit 2 and the human detection circuit 3 are included in the present embodiment, either one or both of the face detection circuit 2 and the human detection circuit 3 may be implemented as a program operating on the processor 4.

This concludes description on the face detection and the human detection.

<Focus Control Processing>

Figure 4:
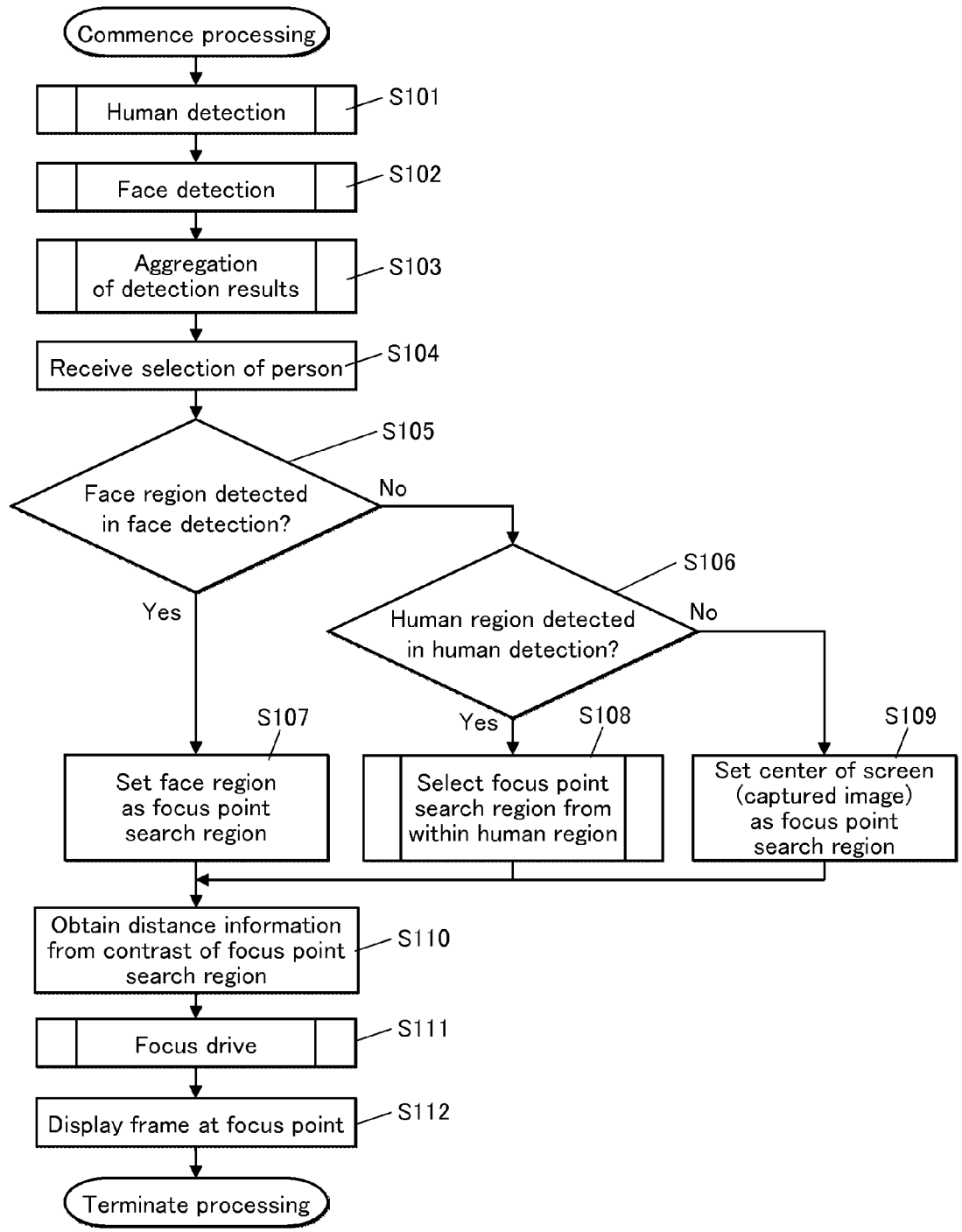
FIG. 4 is a flowchart illustrating focus control processing.

Subsequently, description is provided on focus control processing, which is executed by the processor 4 executing programs. FIG. 4 is a flowchart illustrating the focus control processing. First, the human detection (Step S101) and the face detection (Step S102) are performed with respect to the newest image signal, and a plurality of face detection results and a plurality of human detection results are acquired. Here, note that the face detection and the human detection may be executed in parallel or on a one-by-one basis. Further, when performing the face detection and the human detection one by one, no limitation is imposed as for the order in which the two types of detection are executed.

Figure 5:
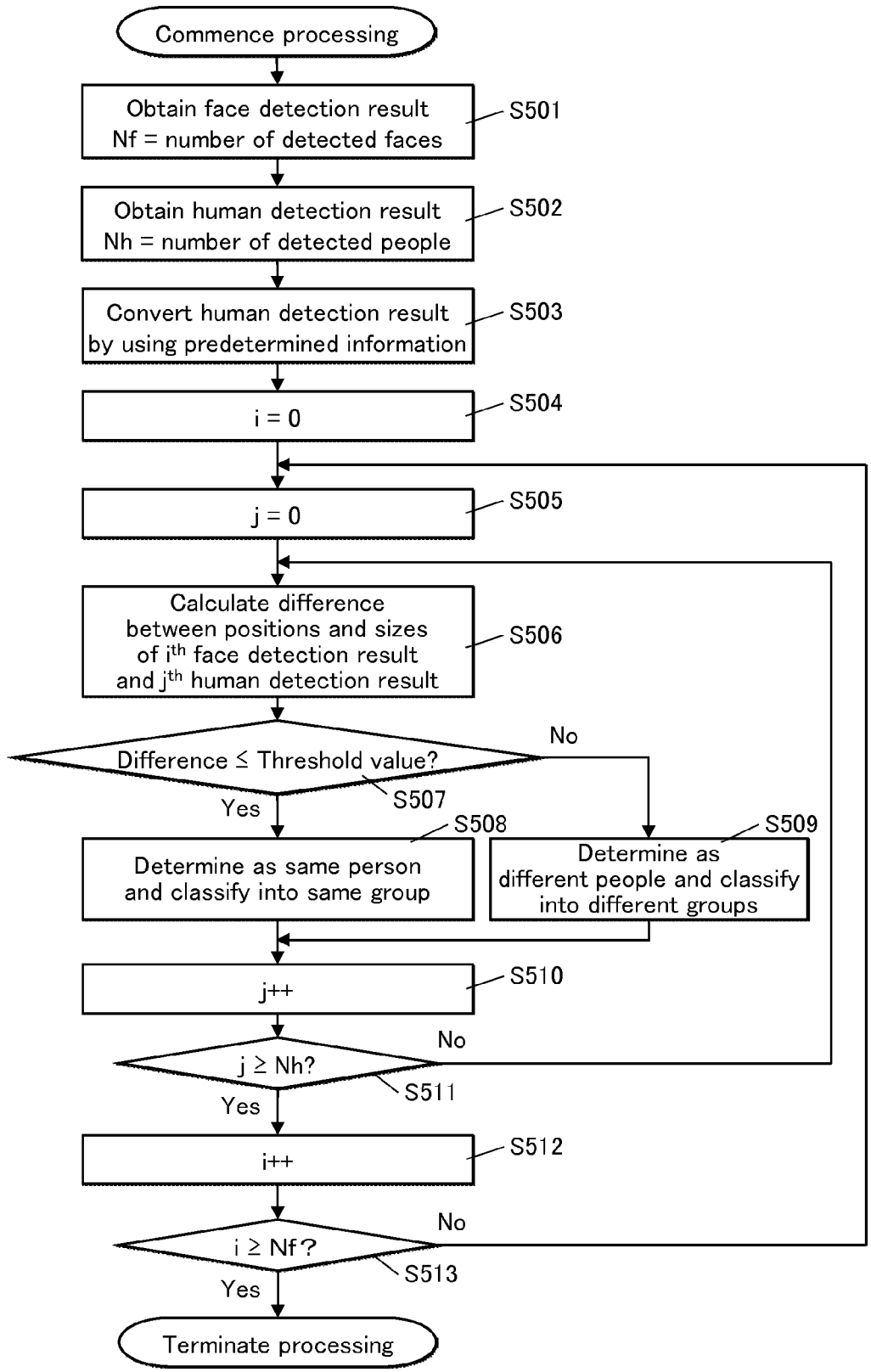
FIG. 5 is a flowchart illustrating procedures involved when aggregating face detection results and human detection results.
Figures 6A, 6B:
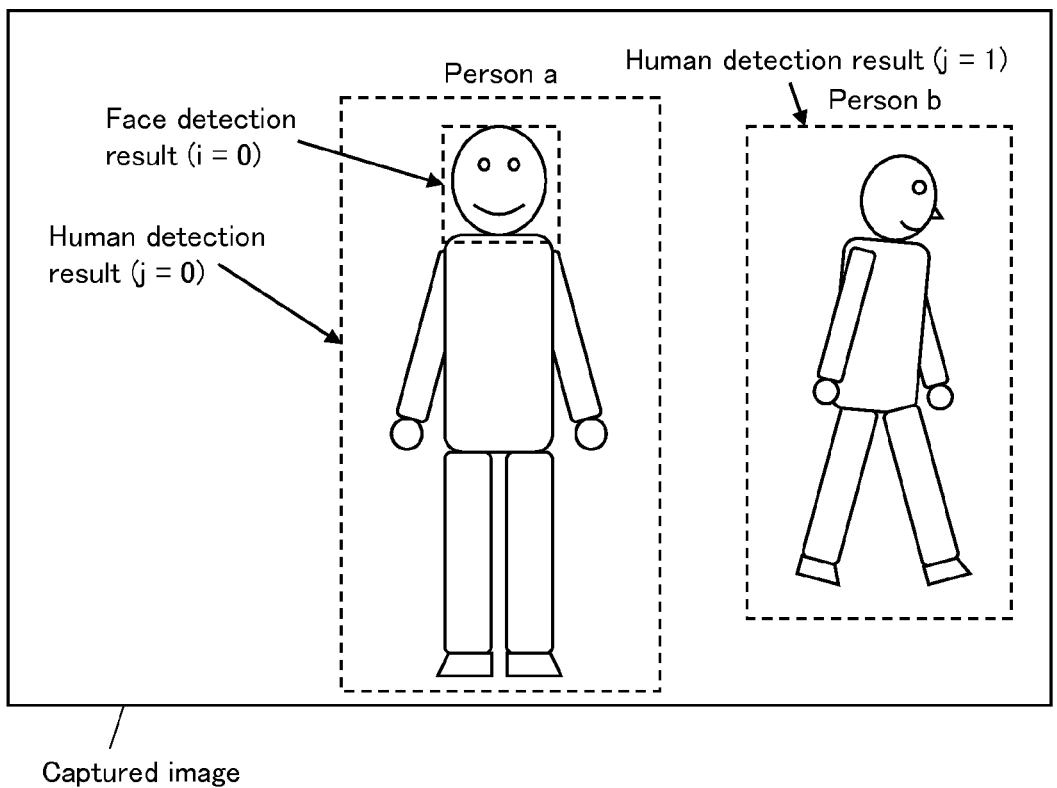
FIGS. 6A and 6B illustrate face detection results and human detection results.

Based on the face detection results and the human detection results so acquired, the processor 4 performs aggregation of detection results which involves aggregating each combination (set) of a face detection result and a human detection result that are determined as corresponding to the same person (Step S103). FIG. 5 is a flowchart illustrating details of the aggregation of detection results. In the aggregation of detection results, the processor 4 first acquires face detection results and human detection results (Steps S501 and S502). When taking as an example a captured image as illustrated in FIG. 6A in which two people appear, the information as illustrated in FIG. 6B is obtained as face/human detection results. In the face/human detection results, a "position" indicates a central coordinate of a corresponding face region/human region relative to a reference point, which is a top left corner of the captured image. Further, in the face/human detection results, a "size" indicates the number of pixels included in a corresponding face region/human region. Here, it should be noted that, in the present embodiment, a size of a given face region in a face detection result is indicated by the number of pixels in a width direction of the captured image, whereas a size of a given human region in a human detection result is indicated by the number of pixels in both the width direction and a height direction of the captured image. This is since, in the present embodiment, the search window for searching for face regions in a captured image is a square region having the same height and width.

In the following, the number of faces having been detected in the captured image as a result of the face detection is denoted as Nf and the number of people having been detected in the captured image as a result of the human detection is denoted as Nh. For instance, in the example illustrated in FIGS. 6A and 6B, Nf equals "1" and Nh equals "2".

Further, so as to enable the determination of which face region and which human region correspond to the same person by comparing face detection results and human detection results, the positions and the sizes in the human detection results are converted so as to be comparable with the positions and the sizes in the face detection results. The conversion is performed by using a predetermined type of information, and further, the positions and the sizes in the human detection results, after conversion, are hereinafter respectively referred to as face-corresponding portion positions and face-corresponding portion sizes (Step S503).

Figure 7:
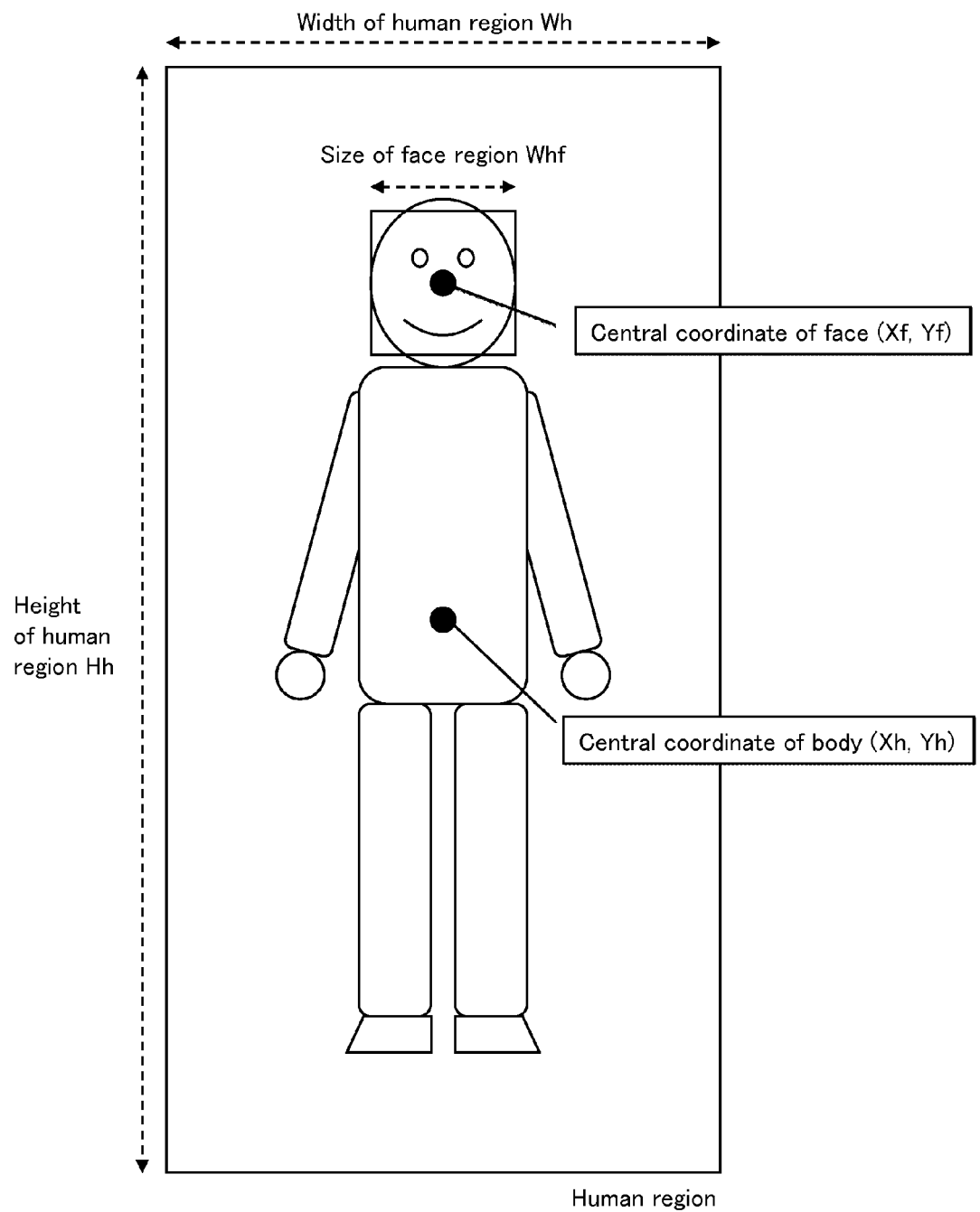
FIG. 7 illustrates a human region detected in a captured image by the human detection.
Figure 8:
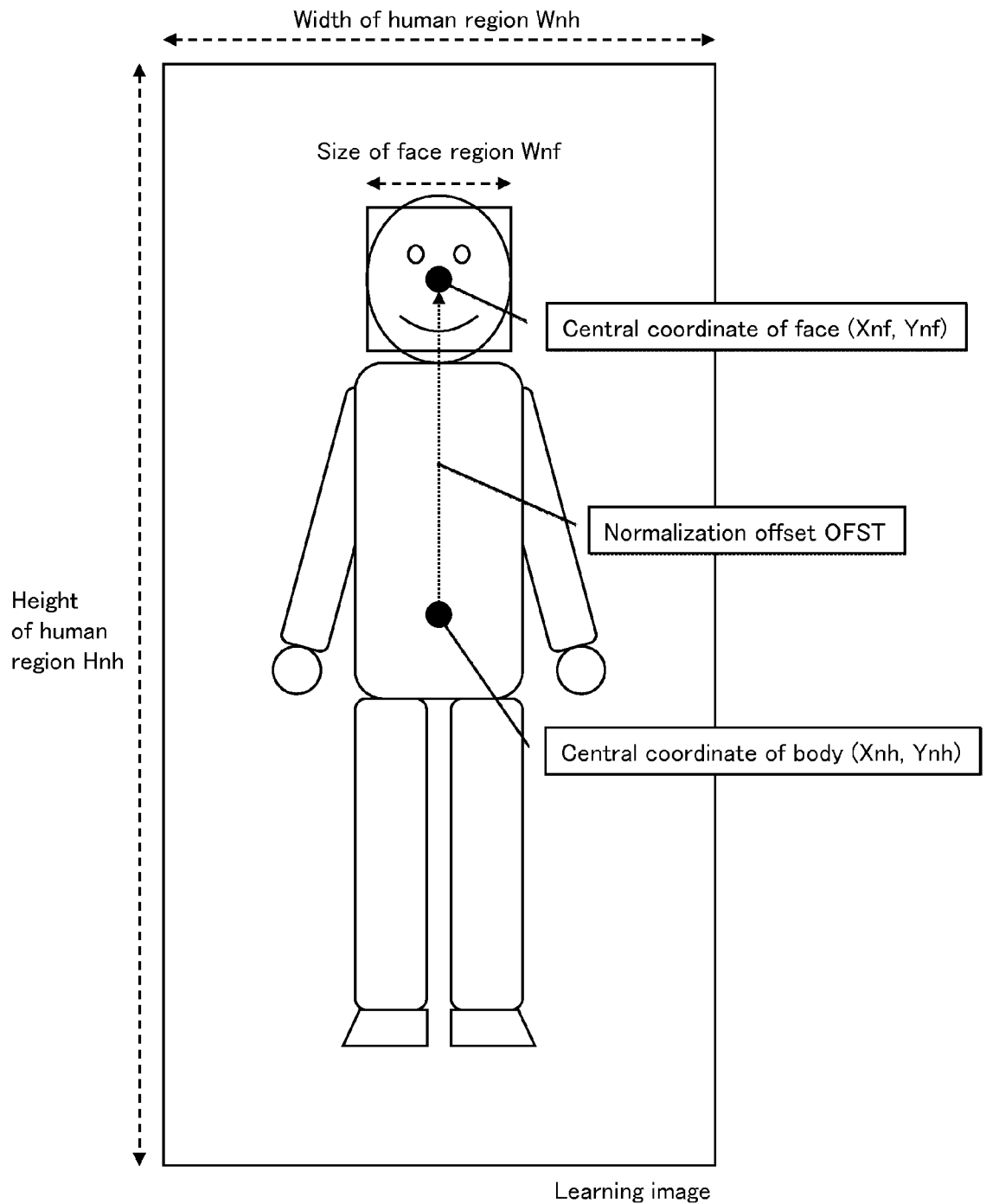
FIG. 8 illustrates a learning image used in learning for the human detection.

In the following, description is provided on details of the conversion of human detection results in Step S503, with reference to FIGS. 7 and 8. FIG. 7 illustrates a human region detected from a captured image as a result of the human detection. Further, FIG. 8 illustrates a learning image used in the learning for the human detection. The learning image used in the learning for the human detection includes a human region having a normalized size. When denoting a size of a face portion in the normalized human image (learning image) as Wnf and a width of the human region in the normalized human image as Wnh, the ratio of the size of the face portion to the width of the human region is calculated as Wnf/Wnh. As such, a face-corresponding portion size indicating a size of a portion assumed as corresponding to a face (hereinafter referred to as a face-corresponding portion) in a human region as illustrated in FIG. 7, which is denoted as Whf, can be calculated by using Formula 1 when the width of the human region is denoted as Wh.

$$Whf = Wh \times (Wnf/Wnh) \quad \text{Formula 1}$$

In addition, when denoting an offset amount, in the normalized human image, from a central position of a body (Xnh, Ynh) to a position of the face (Xnf, Ynf) as OFST and denoting a height of the human region in the normalized human image as Hnh, the offset from the central position of the body to the position of the face, per unit height of the human region, can be calculated as OFST/Hnh.

Based on this, when denoting a height of the human region as illustrated in FIG. 7 as Hh and a central coordinate of the human region as (Xh, Yh), a face-corresponding portion position indicating a position of the face-corresponding portion has a central coordinate (Xf, Yf), which can be calculated by using Formulas 2 and 3.

$$Xf = Xh \quad \text{Formula 2}$$

$$Yf = Yh - Hh \times (\text{OFST}/Hnh) \quad \text{Formula 3}$$

Through the above-described procedures, a position and a size in a human detection result can be respectively converted into a face-corresponding portion position and a face-corresponding portion size. However, the method according to which such a conversion is to be performed is not limited to the above-described method. For instance, the learning image for the human detection need not be used, and conversion coefficients determined through experimentation may be used instead. In addition, in the present embodiment, the conversion is performed such that a position and a size in a human detection result are converted so as be comparable with a position and a size in a face detection result. However, in another embodiment of the present invention, a position and a size in a face detection result may be converted so as to be comparable with a position and a size in a human detection result. In such a case, the conversion is to be performed according to a central position of a body in a human detection result.

In the processing procedures illustrated in FIG. 5 which follow the completion of the conversion of the human detection results, variables i and j are initialized so as to take a value "0" (Steps S504 and S505). In specific, the variable i indicates, among the Nf number of face detection results, a face detection result processed in an $i^{th}$ iteration. Similarly, the variable j indicates, among the Nh number of human detection results, a human detection result processed in a $j^{th}$ iteration.

Following the initialization of the variables, a determination is performed of whether or not a face detection result and a human detection result correspond to the same person, and further, when the face detection result and the human detection result are determined as corresponding to the same person, aggregation of the face detection result and the human region detection result is performed (Steps S506 through Step S509). Here, the determination of whether or not a given face detection result and a given human detection result correspond to the same person (Steps S506 and S507) is performed by calculating (i) a distance between a position in the face detection result and a position in the human detection result, and (ii) a difference between a size in the face detection result and a size in the human detection result, and by comparing the distance and difference so calculated with respective threshold values. Here, a central coordinate of a face region corresponding to a given face detection result is denoted as (Xa, Ya), and a central coordinate of a face-corresponding portion corresponding to a given human detection result is denoted as (Xb, Yb). Further, a threshold value Thdx is compared with an X-direction distance between the central coordinate of the face region and the central coordinate of the face-corresponding portion, and a threshold value Thdy is compared with a Y-direction distance between the central coordinate of the face region and the central coordinate of the face-corresponding portion. In such a case, the position in the face detection result and the position in the human detection result are determined as indicating the same person when both Formulas 4 and 5 are satisfied.

$$|Xb - Xa| \le Thdx \quad \text{Formula 4}$$

$$|Yb - Ya| \le Thdy \quad \text{Formula 5}$$

When at least one of the Formulas 4 and 5 is not satisfied, the face detection result and the human detection result are determined as each indicating a different person. Here, the value calculated by using Formula 6 is used as Thdx and Thdy.

$$Thdx=Thdy=(Whf+Wf)/2 \quad \text{Formula 6}$$

In specific, the threshold values Thdx and Thdy indicate a distance between central coordinates of two adjacent face regions. Therefore, when using such threshold values, aggregation is performed of a human detection result and a face detection result when a face-corresponding portion indicated by a human detection result overlaps a face region indicated by a face detection result.

Subsequently, description is provided on the threshold value to be compared with the difference between a size in a face detection result and a size in a human detection result. Here, it should be noted that, it is difficult to determine sizes of face regions by using the same threshold value for all face regions. That is, for instance, when there are two face regions, one with a size of 24×24 pixels and another with a size of 100×100 pixels and if, for instance, the same threshold value of 50 pixels were defined and used as a threshold value for determination, the threshold value would have a different meaning when compared with each of the two face regions. That is, the threshold value of 50 pixels would indicate an acceptable difference of approximately twice the size of the face region for the face region having the size of 24×24 pixels, whereas the threshold value of 50 pixels would indicate an acceptable difference of approximately half the size of the face region for the face region having the size of 100×100 pixels. As such, face regions (face-corresponding portions) are classified into groups each corresponding to a specific range of size, and the difference between a size in a face detection result and a size in a human detection result is determined according to a distance between a group to which the size in the face detection result belongs and a group to which the size in the human detection result belongs. FIG. 9 illustrates one example of a table defining the groups into which face regions (face-corresponding portions) are classified. According to the table illustrated in FIG. 9, a face region (a face-corresponding portion) having the smallest size has a size of 24×24 pixels, whereas a face region (a face-corresponding portion) having the largest size has a size of 240×240 pixels. As for face regions (face-corresponding portions) having intermediate sizes between the smallest size and the largest size, the face regions (face-corresponding portions) are classified into size groups such that face regions (face-corresponding portions) classified into a given size group are within a range of one-point-two times the smallest size in the size group. Here, a size group to which a size of a face region corresponding to a given face detection result belongs is denoted as Ga, and a size group to which a face-corresponding portion size corresponding to a size of a human region corresponding to a given human detection result belongs is denoted as Gb. Further, the threshold to be compared with the difference between the size in the given face detection result and the face-corresponding portion size corresponding to the size in the given human detection result is denoted as Thg. In such a case, the size in the face detection result and the face-corresponding portion size corresponding to the size in the given human detection result are determined as indicating the same person when Formula 7 is satisfied.

$$|Gb-Ga| \le Thg \quad \text{Formula 7}$$

When Formula 7 is not satisfied, the face detection result and the human detection result are determined as each indicating a different person. Hence, a face detection result and a human detection result are determined as indicating the same person only when all of the three formulas pertaining to the determination (Formulas 4, 5, and 7) are satisfied (Step S507: Yes), whereas a face detection result and a human detection result are determined as each indicating a different person when even one of the three formulas pertaining to the determination is not satisfied (Step S507: No).

When a given face detection result and a given human detection result are determined as indicating the same person, the set of the face detection result and the human detection result is classified into the same group (i.e., aggregated) (Step S508). In contrast, when a given face detection result and a given human detection result are determined as each indicating a different person, the face detection result and the human detection result are each classified into a different group (i.e., not aggregated) (Step S509).

In the following, description is provided on a specific example of procedures involved in the aggregation of detection results. FIG. 10A is a table illustrating face detection results, FIG. 10B is a table illustrating human detection results, and FIG. 10C is a table illustrating detection results after the aggregation (hereinafter referred to as "aggregated detection results"). First, determination is performed of whether or not a face detection result (i=0) and a human detection result (j=0) indicate the same person. So as to make the determination possible, a size and a position in the human detection result (j=0) are respectively converted into a face-corresponding portion size and a face-corresponding portion position. Here, when supposing that, in the normalized human image, the face has a size Wnf of 20 pixels and the human region has a width Wnh of 64 pixels, the face-corresponding portion size is calculated, by using the above-described formula, as Whf0=100×(20/64)=31. Further, when supposing that, in the normalized human image, the offset amount OFST from the central position of the human region to the position of the face equals 48 pixels and the height Hnh of the human region equals 128 pixels, the face-corresponding portion position is calculated, by using the above-described formula, as Xf0=128, Yf0=128-200×(60/128)=53. As such, when the threshold values to be used in the determination are Thdx=Thdy=(32+31)/2=31.5 and Thg=2, calculation is performed of: |Xb−Xa|=0≤31.5; |Yb−Ya|=53−48=5≤31.5; and |Gb−Ga|=1−1=0≤2. Due to all of the three formulas pertaining to the determination being satisfied, the face detection result (i=j) and the human detection result (j=0) are determined as indicating the same person, and thus are classified into the same group identified as "group 0". In the meantime, when performing the same determination with respect to the face detection result (i=0) and a human detection result (j=1), calculation is performed of: |Xb−Xa|=128>31.5. As such, the face detection result (i=0) and the human detection result (j=1) are determined as each indicating a different person. As such, the human region (j=0) is classified into a different group identified as "group 1". Here, each group of information in the aggregated detection results as illustrated in FIG. 10C includes, in addition to a face detection result and a human detection result, information indicating whether or not a determination has been made in the face detection/human detection that a face/person is included (i.e., existence/non-existence of a face/person).

By repeatedly performing the above-described processing according to the procedures in Steps S505 through S513 until the processing has been performed with respect to all possible combinations of a face detection result and a human detection result, face detection results and human detection results are aggregated.

In the focus control processing illustrated in FIG. 4, when multiple groups are included in the aggregated detection results, one group is selected from among the multiple groups (Step S104). As for the method according to which the selection of one group is performed, possible methods include (i) selecting one group related to a photographic object that appears closest to the center of a target captured image and (ii) selecting one group in which a size of a face indicated by a face detection result included in the group has the closest number of pixels to the number of pixels set in advance as a selection parameter.

Further, when the LCD 16 is implemented by a touch panel-type LCD and includes an input device for notifying the processor 4 of information indicating a position on a screen having been touched, one group, among the multiple groups included in the aggregated detection results, can be selected by having the photographer view an image displayed onto the LCD 16 and select one group from among the multiple groups. More specifically, when the above-described method of having the photographer select one group for performing the focus control processing is applied, frames each indicating a photographic object corresponding to one of the multiple groups in the aggregated detection results are rendered on the LCD 16, and the photographer contacts an area within a frame corresponding to a photographic object that he/she would like to bring into focus. When the photographer contacts an area within a given frame as described above, the processor 4 is notified of position information indicating the area, and a face detection result and a human detection result included in a group corresponding to the position information is selected.

In the meantime, when only one group is included in the aggregated detection results, the processing in Step S104 can be skipped.

As described above, the aggregated detection results include information indicating existence/non-existence of a face determined in the face detection. By referring to such information, the processor 4 determines whether or not a face region is detected in the selected group (Step S105). When a face region is detected in the selected group (Step S105: Yes), the face region is set as the focus point search region to be used in focus control. Also, since the aggregated detection result (i.e., the selected group) includes a face detection result in this case, a position and a size of the face region, which is included in the face detection result, is set as a position and a size of the focus point search region to be used in the focus control.

In contrast, when a face result is not detected in the selected group (Step S105: No), a determination is made of whether or not a human region is detected in the selected group (Step S106). When a human region is detected in the selected group, focus point search region setting processing is executed (Step S108). The focus point search region setting processing is processing of setting one sub-region within the human region as the focus point search region. Here, it should be noted that, when the focus point search region is set within a human region, the focus point search region needs to include a body part of a human image. Since each group in the aggregated detection results includes a human detection result, based on a position and a size of the human region, which is included in the corresponding face detection result, a position and a size of a sub-region in the human region including a body part of a human image is set as a position and a size of the focus point search region in the present embodiment. For instance, under the assumption that the center of a human region includes an image of a body part near the center of a person's body, a central position of a human region is set as the position of the focus point search region, and further, a size of the focus point search region is set to one-eighth of the height of the human region and one-fourth of the width of the human region.

When a face region nor a human region has been detected in the selected group (Step S105: No and Step S106: No), as a normal operation mode, a central coordinate of the target captured image, for instance, is set as the focus point search region (Step S109).

Subsequently, contrast information is obtained from the focus point search region having been selected and set according to the above-described determination results (Step S110). Further, distance information is obtained by performing in-focus position search processing according to the contrast method by using the contrast value having been obtained. By driving the focus lens 20 according to the distance information, focus control through which a person desired by the photographer is brought into focus is realized (Step S111).

Here, note that a frame of a rectangular region that indicates the focus point search region may be rendered onto the captured image displayed by the LDC 16 (Step S111). By performing overlaid-display of the focus point search region frame on the captured image, a clear indication can be made to the photographer of a region in the captured image to which the focus point has been set.

This concludes detailed description on the focus control processing. It is desirable that the focus control processing as described above be performed each time a captured image is read in.

According to such a structure, in a case where a face region is not detected, the focus point search region can be set to a region near the center of a body of a person who is a photographic object by using a human detection result. As such, the focus point search region can be stably set to the person, and hence, instability of focus control, which is caused by a posture of the photographic object changing, can be suppressed.

As description has been provided above, one aspect of the present invention is an image capture device comprising: an imaging optical system comprising a focus lens; an imaging unit that captures an optical image formed by the imaging optical system; a first search unit that sets a first search region in the captured image captured by the imaging unit, performs detection, in the first search region, of a partial image that potentially corresponds to a predetermined part of a photographic object, and sets the first search region as a focus point search region in the captured image when the partial image is detected; a second search unit that sets a second search region in the captured image, performs detection, in the second search region, of a photographic object image that potentially corresponds to an entirety of a photographic object, and sets a plurality of candidate focus point search regions within the second search region when the photographic object image is detected, the candidate focus point search regions each being a region in the captured image that is a candidate of the focus point search region; and a focus control unit that performs focus control with respect to the imaging optical system according to a contrast method by using contrast of the focus point search region, wherein the focus control unit, when the partial image is not detected by the first search unit and the photographic object image is detected by the second search unit, sets one or more candidate focus point search regions each including a part of the photographic object image, among the plurality of candidate focus point search regions, as the focus point search region and uses the contrast of the focus point search region to perform the focus control.

Since the image capture device pertaining to one aspect of the present invention comprises the first search unit and the second search unit, even when the first search unit is unable to detect the partial image that potentially corresponds to a predetermined part of a photographic object, focus control according to the contrast method can be performed when the second search unit detects the photographic object image. In such a case, the second search unit sets a plurality of candidate focus point search regions within the second search region, and the focus control unit sets one candidate focus point search region including a part of the photographic object, among the plurality of candidate focus point search regions having been set by the second search unit, as the focus point search region and performs the focus control.

Due to this, even in a case where a partial image having been detected and to which the focus point has been set later becomes temporarily undetected, the focus point is set to a region of the captured image including a part of the photographic object image. As such, the location of the focus point in the captured image is prevented from moving by a great extent.

As such, according to the image capture device pertaining to one aspect of the present invention, stability of focus control is improved in a case where a part of a photographic object is brought into focus according to the contrast method.

Embodiment 2

In embodiment 1, in a case where a face region has not been detected through the face detection while a human region has been detected through the human detection, a center portion of the human region, in which it can be assumed that an image of a body part near the center of a person's body is included, is set as the focus point search region in the focus point search region setting processing executed in Step S108 of the focus control processing illustrated in FIG. 4.

In embodiment 2, description is provided on a modification of embodiment 1 where, in the focus point search region setting processing, a plurality of candidate focus point search regions are set within the human region and one focus point search region is selected from among the plurality of candidate focus point search regions in the above-described case.

Figure 12:
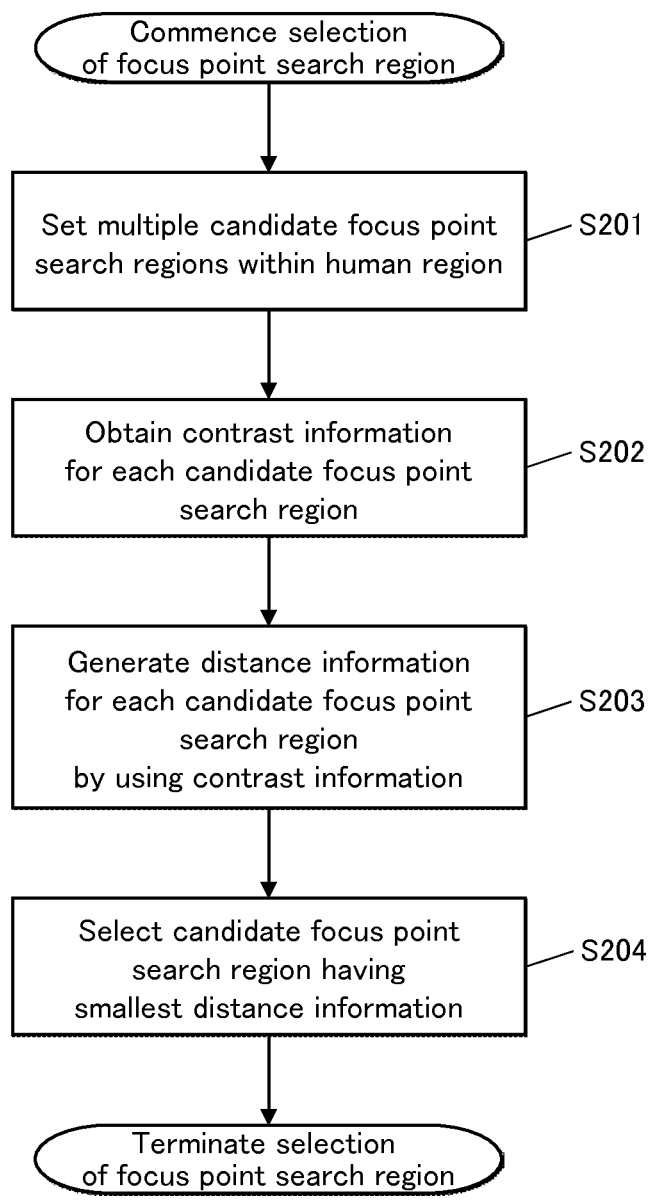
FIG. 12 is a flowchart illustrating focus point search region setting processing pertaining to embodiment 2.

FIG. 12 is a flowchart illustrating the focus point search region setting processing pertaining to the present embodiment. The focus point search region setting processing illustrated in FIG. 12 is executed in a case where a face region is not detected in the face detection while a human region is detected in the human detection in the flowchart illustrated in FIG. 4. Note that the rest of the processing procedures illustrated in FIG. 4 are executed in a similar manner as in embodiment 1.

In the focus point search region setting processing illustrated in FIG. 12, first, a plurality of candidate focus point search regions are set within a human region having been detected in the human detection (Step S201). FIG. 11 illustrates a relation between a human region and the plurality of candidate focus point search regions. The area in FIG. 11 surrounded by solid lines indicates the human region, and each of the areas in FIG. 11 surrounded by broken lines indicates a candidate focus point search region. The plurality of candidate focus point search regions are set within the human region so as to cover as much space in the human region as possible. For instance, in the example illustrated in FIG. 11, three area blocks are set as candidate focus point search regions within the human region in a horizontal direction of the human region and five area block are set as candidate focus point search regions within the human region in a vertical direction of the human region, which results in a total of fifteen candidate focus point search regions being set within the human region. More specifically, each area block corresponding to a candidate focus point search region has a shape of a square with sides each having a length denoted as Wc. Here, the length Wc corresponds to a length of each side of one area block in the normalized human region when the size of the normalized human region is defined by the width Wh and the height Hh. For instance, the length Wc is calculated by using Formula 8.

$$Wc=Wh/4 \qquad \text{Formula 8}$$

Following the setting of the candidate focus point search regions as described above, a piece of contrast information is obtained for each of the candidate focus point search regions (Step S202), and further, a piece of distance information is generated for each of the candidate focus point search regions by using the corresponding contrast information piece (Step S203). Here, the in-focus position search processing according to the contrast method may be applied in the generation of the distance information.

Here, when supposing a case where no interfering object exists between the image capture device 1 and a person who is the photographic object, it is likely that the focus point can be set to the person while ensuring that the focus point is not set to a background by setting a candidate focus point search region that is closest in distance from the image capture device 1 as the focus point search region. As such, by referring to the distance information piece obtained for each of the candidate focus point search regions, a candidate focus point search region corresponding to a distance information piece indicating the smallest distance is selected as the focus point search region. The distance information piece corresponding to the candidate focus point search region so selected is used as information indicating a position to which the focus point is to be set.

Through the above-described procedures, selection can be performed of an appropriate focus point search region by use of which the focus point can be appropriately set to the person.

Here, it should be noted that the manner in which candidate focus point search regions are set described in the present embodiment is merely one example of how candidate focus point search regions can be set, and in another embodiment of the present invention, the candidate focus point search regions may be set in a different manner. For instance, only area blocks in a human region near a trunk of a person's body may be set as candidate focus point search regions, or alternatively, only area blocks in a human region near a face or a head of a person's body may be set as candidate focus point search regions. In addition, the candidate focus point search regions need not have a square shape, and alternatively, the candidate focus point search regions may have a shape of a rectangle whose long side extends in the vertical direction of a captured image. When the candidate focus point search regions are provided with a rectangular shape as described above, the candidate focus point search regions indicate a shape that is closer to a shape of a person.

Further, the size of each candidate focus point search region and the number of candidate focus point search regions to be set within a human region may be changed according to a size of the human region. In a case where a human region has a relatively small size, the size of each candidate focus point search region set within the human region becomes smaller if the size of each candidate focus point search region and the number of candidate focus point search regions to be set within a human region are fixed. When the size of each candidate focus point search region set within the human region becomes smaller, the number of pixels usable for calculating a contrast information piece for each candidate focus point search region decreases. Due to this, there is a risk of the calculation of the contrast information being more strongly influenced by noise than in a case where a human region has a relatively large size, and hence, there is a risk of the accuracy with which the calculation of the contrast information is performed decreasing. As such, in the above-described case where a human region has a relatively small size, it is desirable that adjustment control be performed such that a size of each candidate focus point search region is enlarged while the total number of candidate focus point search regions is reduced.

In addition, when setting a plurality of candidate focus point search regions in a human region, the candidate focus point search regions need not have a uniform size, and alternatively, candidate focus point search regions having different sizes may be set within the human region. For instance, candidate focus point search regions may be set within a human region so as to be in accordance with a shape of a person by providing candidate focus point search regions near a face or a head of a person's body a relatively small size while providing candidate focus point search regions near a trunk of a person's body with a relatively great size. By setting the candidate focus point search regions within a human region in such a manner, the total number of candidate focus point search regions to be set within the human region can be reduced. As such, the amount of processing required in the selection of the focus point search region can be reduced.

In addition, the method indicated in the flowchart illustrated in FIG. 12 of selecting the focus point search region from among candidate focus point search regions is merely one example of how the selection of the focus point search region can be performed, and in another embodiment of the present invention, the focus point search region may be selected in a different manner. For instance, the photographer may be urged to directly select the focus point search region from among one or more candidate focus point search regions. For instance, when the LCD 16 is a touch panel-type LCD, a display device incorporating the LCD 16 includes an input device which receives input when the photographer touches a given position on the LCD 16. As such, information on the position on the LCD 16 having been touched by the photographer can be obtained. The above-described method where the photographer is urged to directly select the focus point search region from among one or more candidate focus point search regions is realized by using such information. More specifically, one or more frame images each indicating one among one or more candidate focus point search regions are displayed onto the LCD 16. The photographer is able to specify a desired position on the LCD 16 by touching a frame image corresponding to one candidate focus point search region, among the one or more candidate focus point search regions, that he/she would like to bring into focus. The processor 4, since being able to identity a region in the captured image that the photographer considers desirable according to the information pertaining to the position of the LCD 16, is capable of selecting the focus point search region from among the one or more candidate focus point search regions.

Note that, although description is provided above on a method of selecting a position corresponding to the focus point search region by using a touch panel, this is a mere example of how the selection may be performed. For instance, the selection of a position corresponding to the focus point search region may be performed by using a function button (undepicted) provided to a camera (i.e., the image capture device 1).

Here, note that the above-described frame images each having a rectangular shape and each indicating a corresponding candidate focus point search region may be rendered by the processor 4 onto the captured image displayed by the LCD 16. In such a case, for instance, by displaying on the LCD 16 a candidate focus point search region having been selected (i.e., the focus point search region) from among the one or more candidate focus point search regions and the rest of the candidate focus point search regions not having been selected by using frames having different colors, a clear notification may be made to the photographer of the area in the captured image to which the focus point has been set.

According to this structure, in a case where the focus point search region is to be set by using a human detection result, the focus point search region can be stably set to a person who is the photographic object, and hence, instability of focus control, which is caused by a posture of the photographic object changing, can be suppressed.

<Modification 1>

The method illustrated in FIG. 12 involves selecting one candidate focus point search region, among multiple candidate focus point search regions, whose focal distance is closest as the focus point search region and setting the focus point to the focus point search region. However, when employing this method, the focus point is set to an interfering object when an interfering object exists between the image capture device 1 and a person who is the photographic object. In view of such a problem, description is provided in the following on a modification of the focus point search region setting processing in embodiment 2 where exclusion of an interfering object is performed when setting the focus point.

Figure 13:
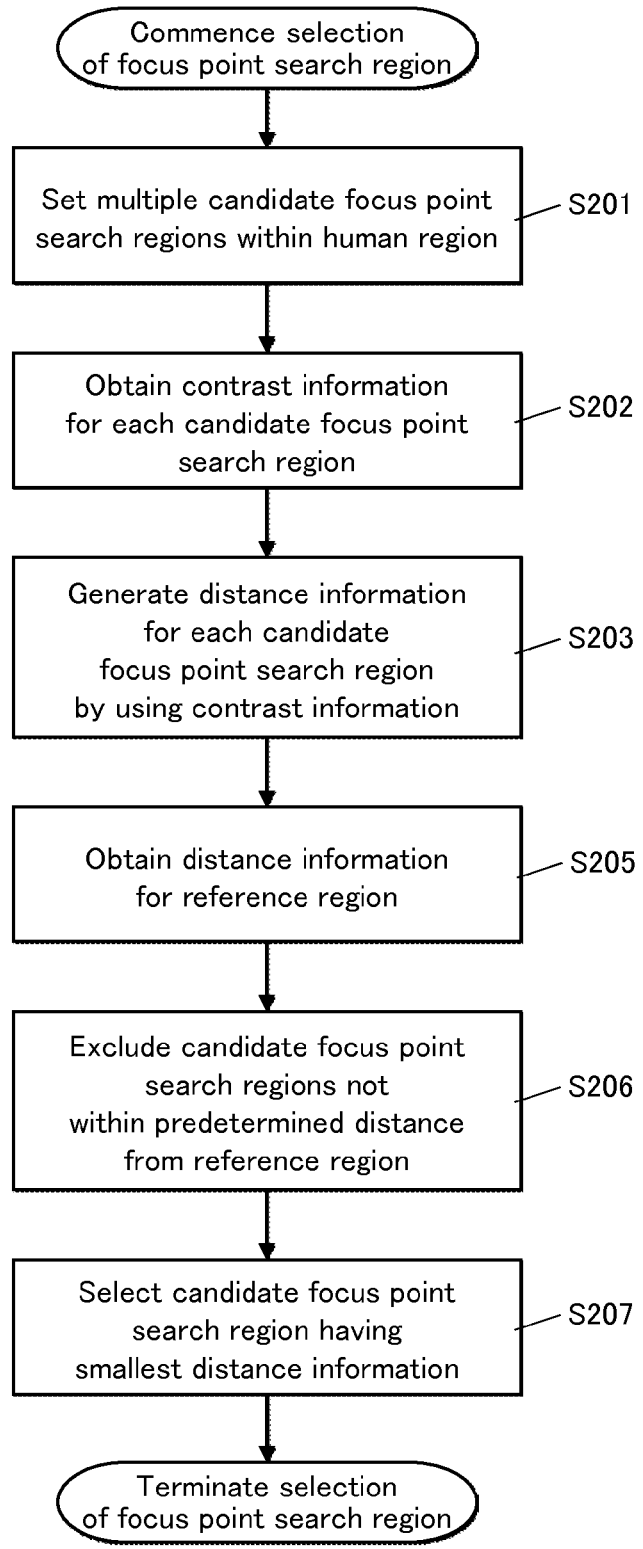
FIG. 13 is a flowchart illustrating focus point search region setting processing pertaining to a modification of embodiment 2.

FIG. 13 is a flowchart illustrating focus point search region setting processing pertaining to the present modification.

When comparing the focus point search region setting processing illustrated in FIG. 13 with the processing procedures illustrated in FIG. 12, the processing procedure of Step S204 in the processing procedures illustrated in FIG. 12 is replaced with processing procedures of Step S205 through S207 in the focus point search region setting processing illustrated in FIG. 13. As such, description is provided in the following on processing procedures in the focus point search region setting processing illustrated in FIG. 13 that differ from the processing procedures illustrated in FIG. 12. First, in Step S205, a distance information piece (reference distance Ds) of one candidate focus point search region that is to be set as a reference region, among multiple candidate focus point search regions having been set within the human region, is obtained.

Following this, among the multiple candidate focus point search regions having been set within the human region, candidate focus point search regions corresponding to distance information pieces each indicating a distance not within a predetermined range of distance from the reference distance Ds are excluded from the candidate focus point search regions from which the selection of the focus point search region is to be performed, while candidate focus point search regions corresponding to distance information pieces indicating a distance within the predetermined range of distance from the reference distance Ds are not excluded and are used as candidate focus point search regions from which the selection of the focus point search region is to be performed (Step S206). Subsequently, a candidate focus point search region corresponding to a distance information piece indicating the smallest distance is selected as the focus point search region from among the candidate focus point search regions from which the selection of the focus point search region is to be performed (Step S207). By excluding candidate focus point search regions corresponding to distance information pieces each indicating a distance not within the predetermined range of distance from the reference distance Ds from the candidate focus point search regions from which the selection of the focus point search region is to be performed as described above, it is ensured that the focus point is not set to an interfering object existing between the image capture device 1 and the photographic object, and hence, it is more likely that the focus point is set to a person who is the photographic object.

Figure 14:
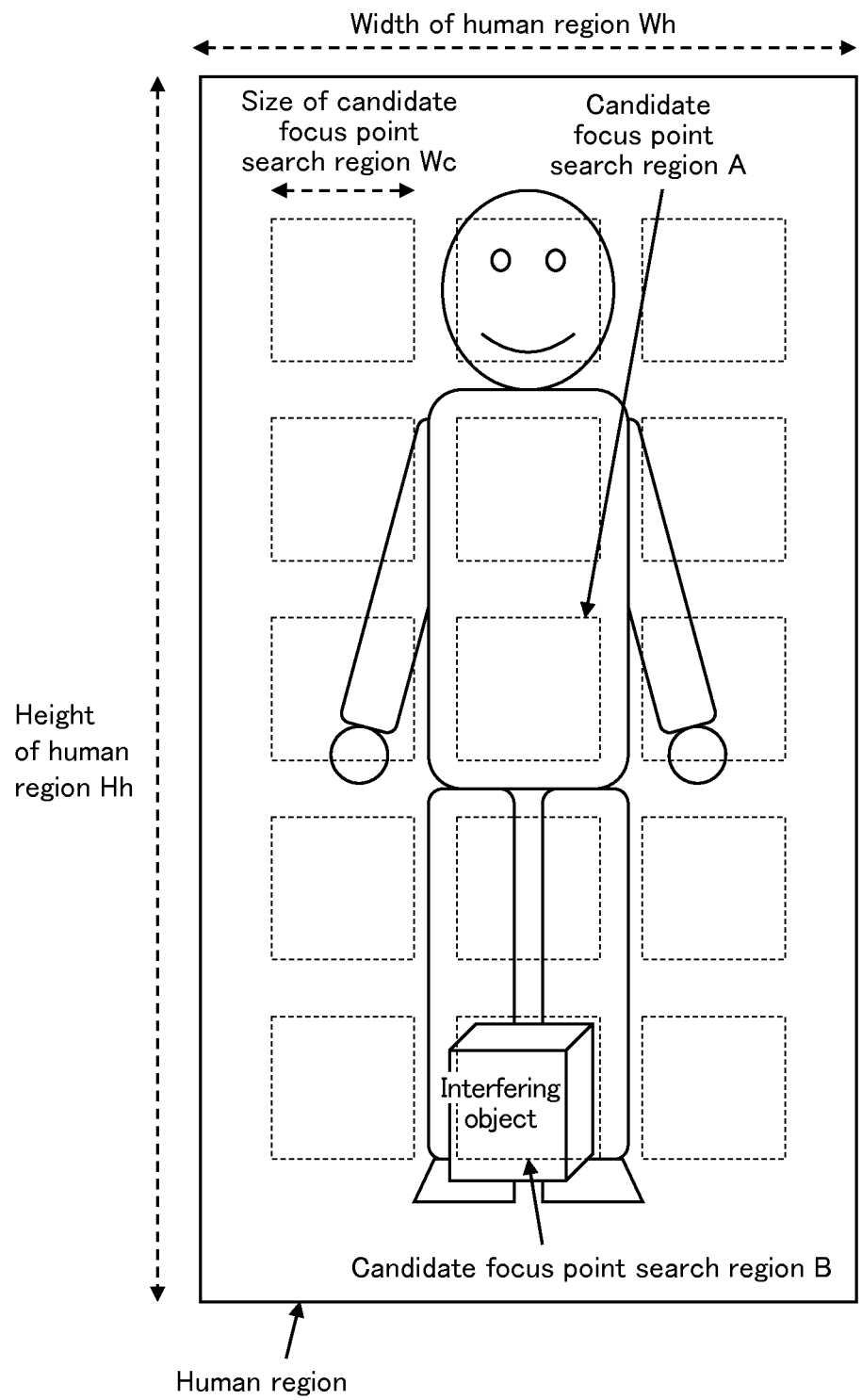
FIG. 14 illustrates one example of a reference region in a case where an interfering object lies in front of a person.
Figure 15:
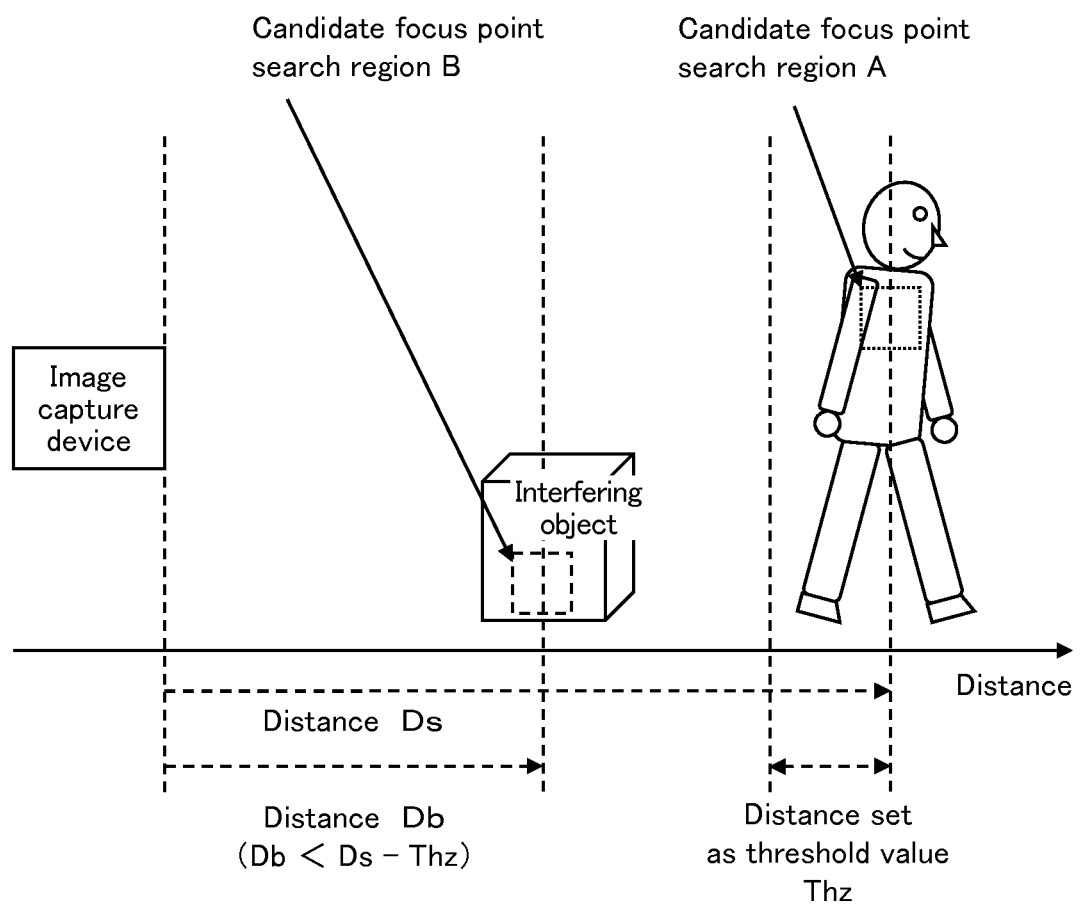
FIG. 15 is a diagram for explaining a distance between two candidate focus point detection regions.

Here, it is desirable that, among multiple candidate focus point search regions having been set within a human region, a candidate focus point search region located near the center of a person's body be used as the reference region. For instance, suppose a case as illustrated in FIG. 14 where, among multiple candidate focus point search regions having been set within a human region, a candidate focus point search region A that includes a central point of the human region is set as the reference region. In such a case, as illustrated in FIG. 15, only candidate focus point search regions whose corresponding distance pieces indicate distances within a distance Thz from the reference distance Ds are used in the selection of the focus point search region while candidate focus point search regions whose corresponding distance pieces indicate distances not within the distance Thz from the reference distance Ds are excluded from the candidate focus point search regions from which the selection of the focus point search region is to be performed. That is, candidate focus point search regions corresponding to distance information pieces indicating a distance smaller than Ds−Thz are excluded from the candidate focus point search regions from which the selection of the focus point search region is to be performed. As such, in the example illustrated in FIG. 15, a candidate focus point search region B (corresponding to a distance information piece indicating a distance Db<Ds−Thz) is excluded from the candidate focus point search regions from which the selection of the focus point search region is to be performed. Due to this, even in a case as illustrated in FIG. 15, it is ensured that the focus point is not set to an interfering object existing between the image capture device 1 and a person who is the photographic object, and it is more likely that the focus point is set to the person. Further, the distance Thz used as a threshold value in the above-described case may be changed in accordance with the size of a person detected in the captured image. By changing the threshold distance Thz in such a manner, interfering objects can be excluded with an increased level of accuracy. More specifically, any value may be set as the distance Thz provided that the value has a magnitude similar to a depth of a person, and further, it is desirable that a relatively great value be set to the distance Thz when a human region has a relatively great size whereas it is desirable that a relatively small value be set to the distance Thz when a human region has a relatively small size.

Formula 9 is one example of a formula that may be used for calculating the distance Thz according to a size of a human region.

$$Thz = Hh \times (Wnh/Hnh)/2 \qquad \text{Formula 9}$$

Since the ratio of the width of the normalized human image illustrated in FIG. 8 to the height of the normalized human image illustrated in FIG. 8 can be obtained by Wnh/Hnh, the distance Thz can be calculated so as to be similar to a depth of a person appearing facing sideways in the human region by using Formula 9, which is a formula in which the height Hh of the human region having been detected through the human detection and the above-described ratio are multiplied.

Note that the above-described method for setting the reference region is merely provided as one example of how the reference region may be set, and in another embodiment of the present invention, the setting of the reference region may be performed in a different manner. For instance, calculation may be performed of an average of distances indicated by distance information pieces corresponding to all of the candidate focus point search regions and the average distance so calculated may be set as the reference distance. Alternatively, a distance information piece indicating a distance of a focus point of a previously-shot image may be set as the reference distance.

Note that the above-described method for setting the threshold value Thz is merely provided as one example of how the threshold value Thz may be set, and in another embodiment of the present invention, the setting of the threshold value Thz may be performed in a different manner.

<Modification 2>

In the following, description is provided on a modification of embodiment 2 where, in connection with the processing of setting multiple candidate focus point search regions in a human region corresponding to Step S201 in FIGS. 12 and 13, positions of one or more candidate focus point search regions are corrected by using direction information obtainable from human detection results.

According to the present embodiment, before obtaining contrast information for candidate focus point search regions in the processing procedures in FIGS. 12 and 13, correction of positions of the candidate focus point search regions is performed by using information (direction information) included in the human detection results.

Figure 16:
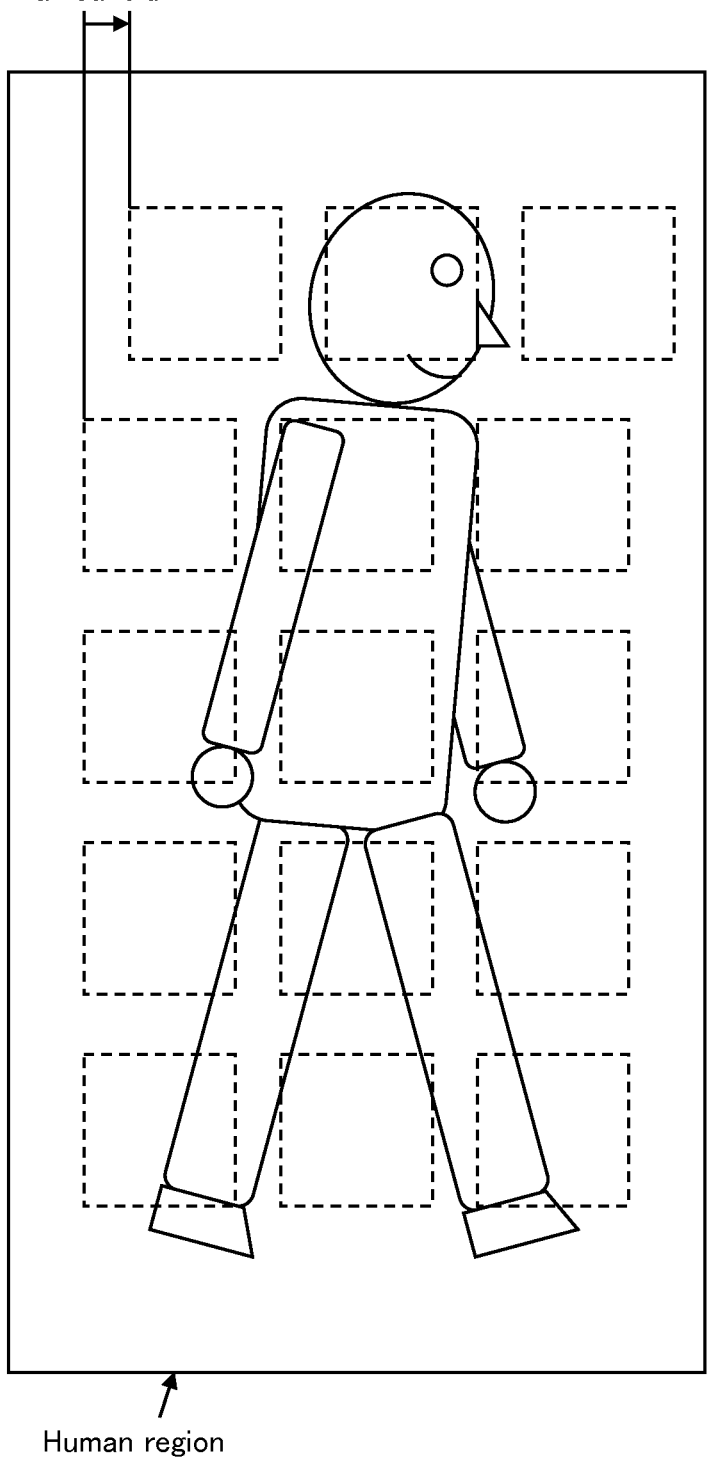
FIG. 16 is a diagram for explaining a correction amount for correcting positions of candidate focus point detection regions within a human region.

Very often, a person, when travelling in a given direction, is observed as being in a forward-bent posture bent towards the direction of travel. This tendency becomes particularly evident when a person is running. When a person is running, his/her head is located further frontwards relative to his/her body in the direction of travel compared to when the person is standing upright. Due to this, in a case where candidate focus point search regions that are based on the assumption that a person appearing in a human region is standing upright and facing in the direction of the lens are set at respective positions within the human region as illustrated in FIG. 11 and the human region actually includes an image of a running person, there is a risk of the candidate focus point search regions having been set at positions corresponding to a head of the person being out of alignment with the actual position of the head of the running person, and thereby including the background in a great proportion. Such a situation leads to unstable focus, and therefore is undesirable. As a countermeasure against such a situation, the correction of positions of candidate focus point search regions is performed, one example of which is illustrated in FIG. 16. A direction in which a person included in a human region is facing is indicated by "direction/inclination" information included in a corresponding human detection result. For instance, when a person is facing towards the right in a captured image, candidate focus point search regions set to positions near the head of the person are shifted towards the right in the horizontal direction of the captured image by a correction amount d. By performing the correction of positions of candidate focus point search regions in such a manner, it is more likely that candidate focus point search regions set to positions near a head of a person included in a human region match the actual position of an image of the head of the person.

Note that, it is desirable that the correction amount d be changed in accordance with a size of a person included in the human region. By changing the correction amount d such that a relatively great value is set to the correction amount d when a size of a person included in the human region is relatively great and a relatively small value is set to the correction amount d when a size of a person included in the human region is relatively small, the relation between the correction amount d and the size of the person included in the human region can be maintained at the same level even when the size of the person changes. As such, stable focus control is realized.

Further, it may also be considered to determine the magnitude of the correction amount d based on a speed of movement of a person included in a human region. When determining the magnitude of the correction amount d based on a speed of movement of a person included in a human region, calculation is performed of the speed of movement of the person by utilizing the motion estimation unit 5, etc. Further, in such a case, a relatively great amount is to be set to the correction amount d based on the assumption that the person is bent further forwards in the direction of movement when the movement speed is relatively great, whereas a relatively small amount is to be set to the correction amount d when the movement speed is relatively small. Further, in such a case, a value "0" may be set to the correction amount d when the movement speed indicates a slow speed of a certain level. This is since, when a person is walking, the degree to which the person's body is bent forward does not reach the degree referred to as a forward-bent posture.

Note that the above-described method for determining the correction amount is merely provided as one example of how the correction amount may be determined, and in another embodiment of the present invention, the determination of the correction amount may be performed in a different manner.

In addition, when information indicating a direction to which a human region is facing is detectable through the face detection, the direction information in the face detection results may be used as the direction information used in the correction of the positions of the candidate focus point search regions instead of the direction information in the human detection results.

Embodiment 3

Figure 17:
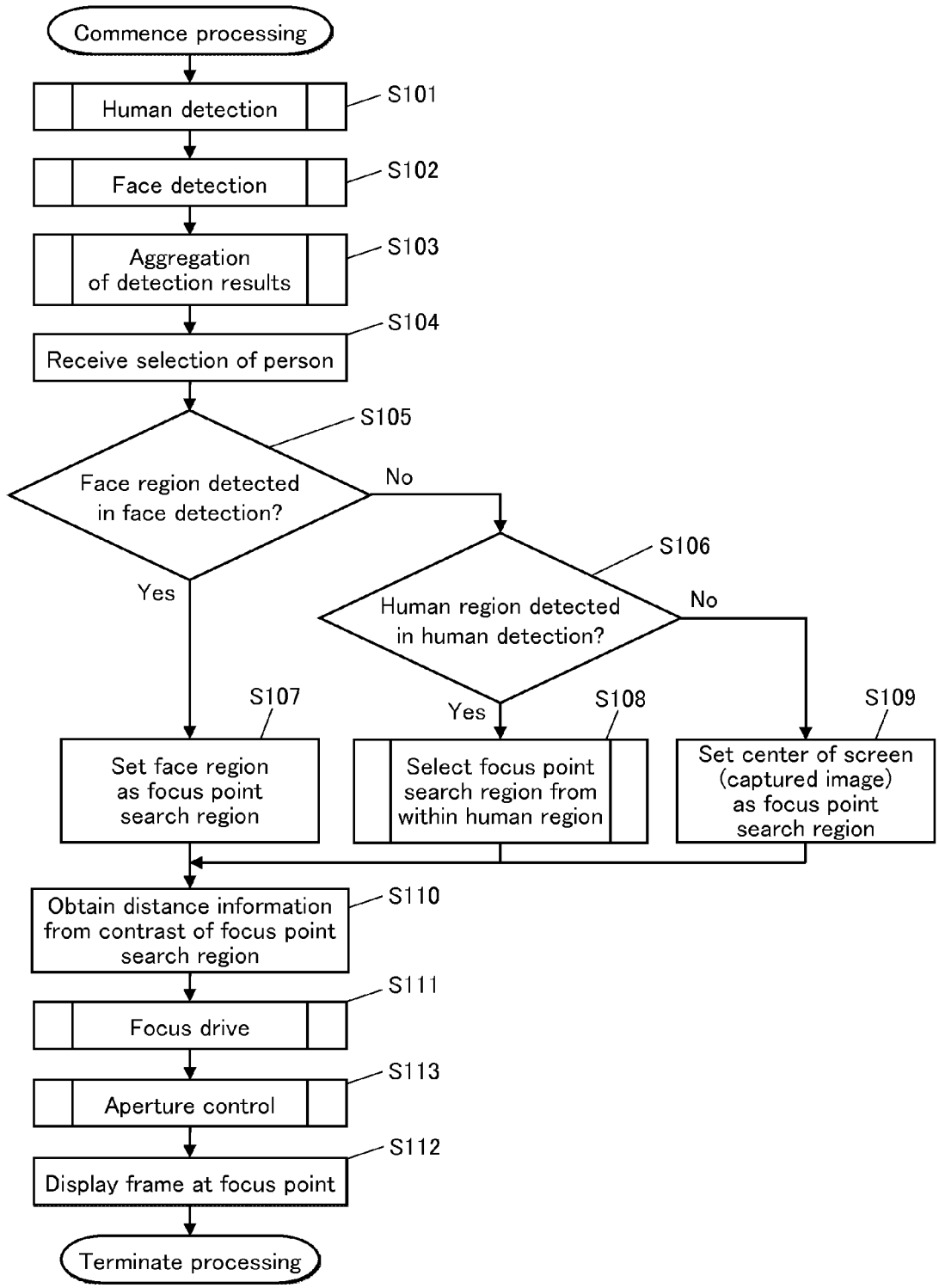
FIG. 17 is a flowchart illustrating focus control processing pertaining to embodiment 2.
Figure 18:
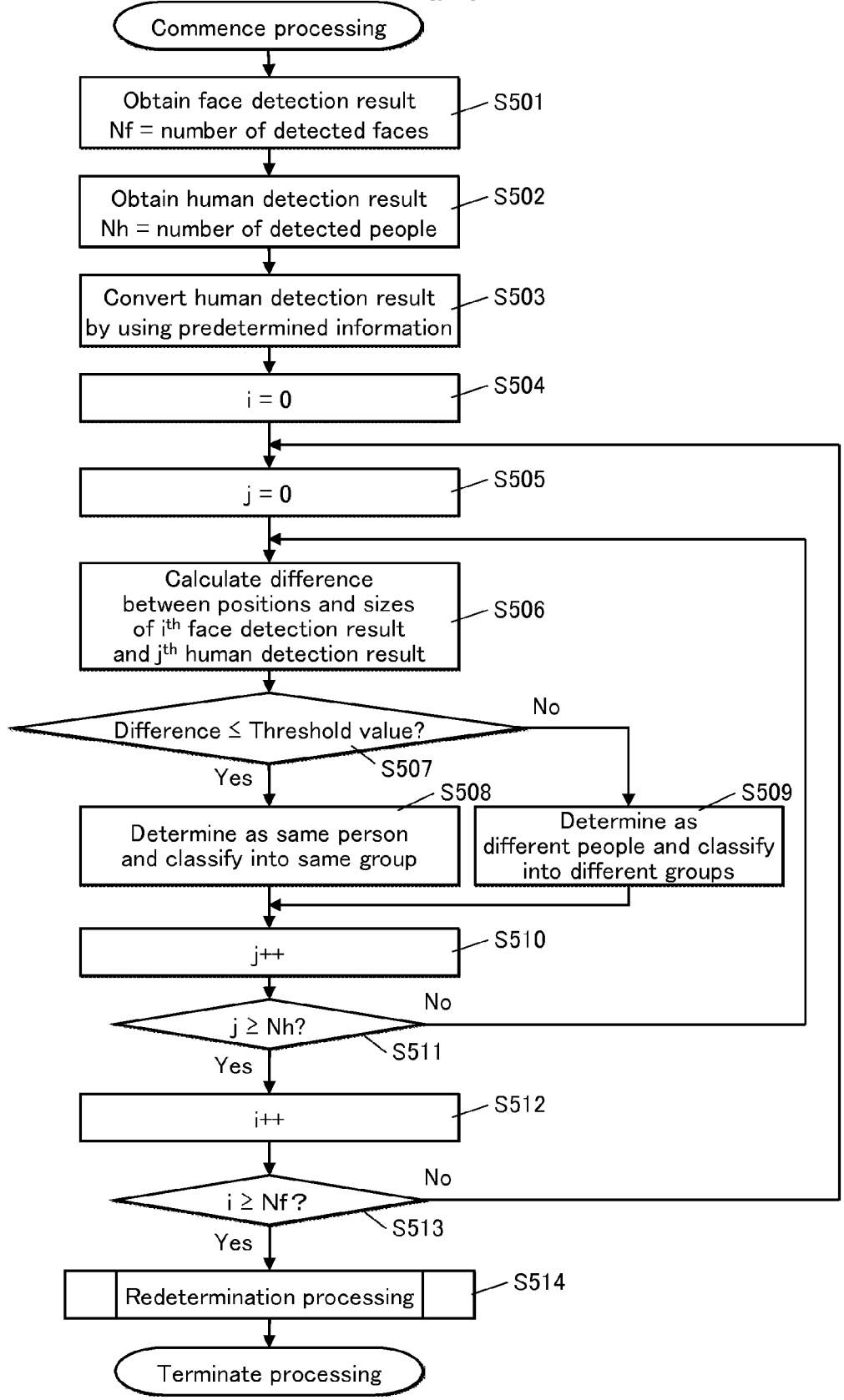
FIG. 18 is a flowchart illustrating procedures involved when aggregating face detection results and human detection results in embodiment 4.

FIG. 18 is a flowchart illustrating focus control processing pertaining to embodiment 3. In FIG. 17, processing procedures similar to those in FIG. 4 are indicated by using the same reference signs, and further, description on such processing procedures are omitted in the following.

The processing procedures in FIG. 17 include, in addition to the processing procedures in FIG. 4, processing of controlling the aperture 19 so as to realize a greater depth of field. In the following, description is provided on a case where, in the flowchart in FIG. 17, a face region has not been detected while a human region has been detected (Step S105: No and Step S106: Yes.)

After setting a human region detected through the human detection as the focus point search region and performing focus control, control of the aperture 19 is performed in Step S113 such that an entirety of the human region is included in a depth of field. By performing control of the aperture 19 in such a manner, the photographer, while not being able to shoot an image having a shallow depth of field, is freed from disappointment experienced in a case of unstable focus.

In addition, when applying, as the focus point search region setting processing in Step S108, the processing procedures illustrated in FIGS. 12 and 13 where the focus point search region is selected from among a plurality of candidate focus point search regions, the control of the aperture 19 is performed in Step S113 by using the distance information such that the focus point search region having been selected is included within the depth of field. By performing the control of the aperture 19 in such a manner, it is possible to improve the stability with which focus control is performed with respect to a person who is a photographic subject while the aperture 19 is controlled so as to be as wide as possible.

According to such a structure, the control of the aperture 19 is performed such that a person is brought into focus even when a face of the person has not been detected. As such, the risk of unstable focus control being performed is suppressed.

Note that the above-described method for controlling the aperture 19 is merely provided as one example of how the aperture 19 may be controlled, and in another embodiment of the present invention, the control of the aperture 19 may be performed in a different manner. For instance, the control of the aperture 19 may be performed by using the distance information pieces obtained in Step S203 for all candidate focus point search regions such that all candidate focus point search regions having been set in Step S201 are included within the depth of field.

Embodiment 4

In the present embodiment, description is provided on a structure where redetermination of detection results is performed in the aggregation of face detection results and human detection results.

FIG. 18 is a flowchart illustrating details of the aggregation of face detection results and human detection results in the present embodiment. In the present embodiment, since redetermination of detection results is performed in the aggregation of face detection results and human detection results, the threshold value used in the face detection (the value compared with the evaluation value in the face detection) is set to a smaller value compared to a threshold value used when face detection is performed on an individual basis (e.g., the threshold value used in the face detection in embodiment 1). Note that, by setting a relatively small value to the threshold value, a greater number of face regions are detected in the face detection. However, at the same time, by setting a relatively small value to the threshold value, the risk also increases of face regions not actually including people's faces being detected (such cases hereinafter referred to as cases of "erroneous detection"). However, by performing the redetermination of detection results as described in detail in the following, the generation of erroneous detection results can be suppressed.

Figure 19:
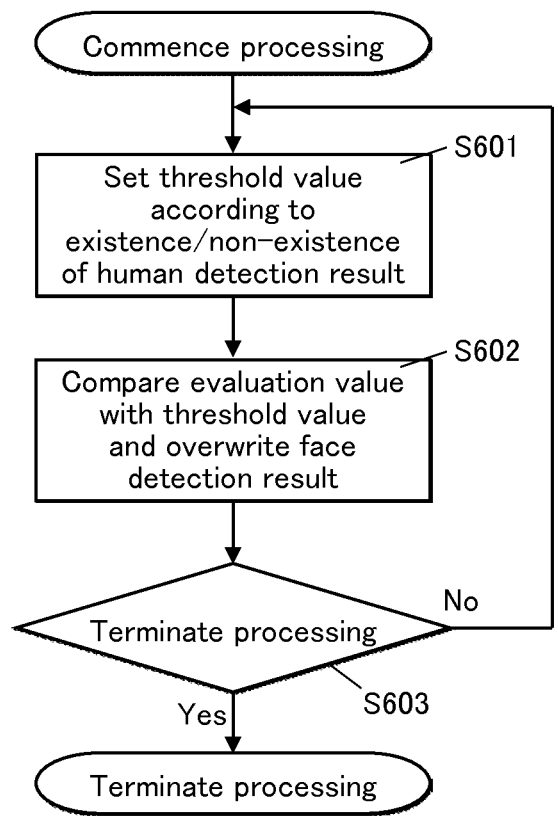
FIG. 19 is a flowchart illustrating details of redetermination processing in embodiment 4.

In the flow of processing of the aggregation of detection results illustrated in FIG. 18, after the aggregation of face detection results and human detection results is completed and the face detection results and the human detection results are classified into groups, redetermination of the face detection results is performed (Step S514). FIG. 19 is a flowchart illustrating details of redetermination processing. In the redetermination processing, first, for a given group in the aggregated detection results, a threshold value to be used in the redetermination of a face detection result in the group is set in accordance with existence/non-existence of a human detection result (Step S601). Here, it can be said that, in general, a face detection result belonging to a group in the aggregated detection results that also includes a human detection result is likely to correspond to a person's face. This is since, a face region corresponding to such a face detection result has been detected at a position similar to a face-corresponding portion position estimated from a corresponding human detection result. As such, when a given group in the aggregated detection results includes both a face detection result and human detection result, the threshold value to be used in the redetermination of the face detection result is set to the same value as used in the initial face detection.

In contrast, it can be said that a face detection result not belonging to a group in the aggregated detection results that includes a human detection result is less likely to correspond to a person's face compared to the above-described case where a face detection result belongs to a group in the aggregated detection results that also includes a human detection result. This is since, such a face detection result has been detected on a individual basis without any connection with the human detection. As such, when a given group in the aggregated detection results includes a face detection result but not a human detection result, the threshold value to be used in the redetermination of the face detection result is set to a higher value than used in the initial face detection so as to suppress the occurrence of erroneous detection.

Subsequently, the redetermination of the face detection result is performed according to the threshold value set in Step S601, and further, overwriting of the original determination result, which indicates whether or not a face has been detected in the initial face detection, with a result of the redetermination is performed (Step S602). By performing the above-described processing with respect to all groups in the aggregated detection results, a face detection ratio, which is a ratio of faces actually detected in the captured image to a total number of faces that should be detected in a captured image, can be increased while the occurrence of erroneous detection is suppressed.

In the following, detailed explanation is provided on the redetermination processing, with reference to a specific example illustrated in FIGS. 20A and 20B. Here, suppose that a relatively small threshold value of "3" has been used in the initial face detection, whereas a relatively great threshold value of "5" is used in face detection performed on an individual basis. According to the example illustrated in FIG. 20A, when aggregating face detection results and human detection results obtained from a captured image illustrated in FIG. 20A according to the flow of processing illustrated in FIG. 18, the lowermost table among the three tables illustrated in FIG. 20B is obtained. The redetermination of face detection results is performed with respect to the aggregated detection results in the lowermost table in FIG. 20B. First, "group 0" includes a human detection result in addition to a face detection result. As such, the same threshold value "3" as used in the initial face detection is used in the redetermination of the face detection result. Here, when performing the redetermination by comparing an evaluation value corresponding to the face detection result with the threshold value "3", a determination is made that a face is detected. As such, the original determination result of "face region detected (1)" is overwritten with the redetermination result, which also indicates "face region detected (1)". Subsequently, "group 1" includes a human detection result in addition to a face detection result. As such, similar as in the case of "group 1", the same threshold value "3" as used in the initial face detection is used in the redetermination. As such, a determination result of "face region detected (1)" is obtained through the redetermination, which is similar to the determination result obtained in the initial determination. Finally, "group 2" includes a face detection result but does not include a human detection result. Due to this, the threshold value "5", which is the threshold value used when performing face detection on an individual basis, is used as the threshold for performing the redetermination. Here, since an evaluation value corresponding to the face detection result in "group 2" is "3", which is lower than the threshold value "5", the redetermination result of "face region not detected (0)", which differs from the original determination result of "face region detected (1)", is overwritten to the original determination result. This concludes the redetermination of the face detection results in the example illustrated in FIGS. 20A and 20B.

In the present embodiment, human detection results are used to increase the face detection ratio. However, the present invention is not limited to this, and alternatively, face detection results may be used to increase a human detection ratio, which is a ratio of people actually detected in a captured image to a total number of people that should be detected in the captured image. Further, the redetermination may be performed by using both evaluation values corresponding to face detection results and evaluation values corresponding to human detection results. For instance, the redetermination may be performed by adding an evaluation value of a face detection result and an evaluation value of a corresponding human detection result and by comparing the sum of the evaluation values with a threshold value or the like.

It is desirable that the aggregation of detection results as described above be performed each time a captured image is read in. According to such a structure, by using a set of a face detection result and a human detection result, the face detection ratio can be increased. Such an increase in the face detection ratio leads to the setting of the focus point search region being performed with an increased degree of stability, and further, leads to unstable focus control being suppressed.

Embodiment 5

In the present embodiment, description is provided on a structure for improving the performance of the image capture device, or more specifically, the accuracy with which the image capture device detects people images in captured images, by using face detection results and human detection results in combination.

Figure 3:
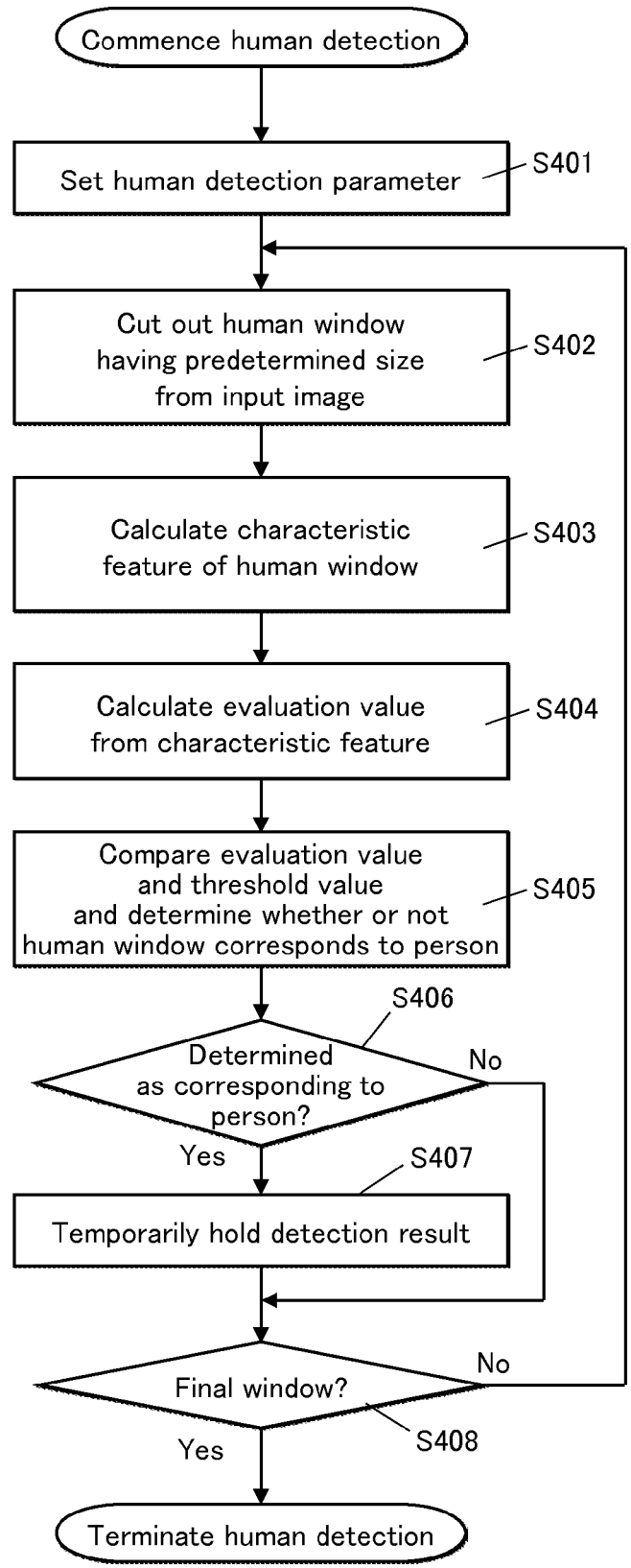
FIG. 3 is a flowchart illustrating procedures involved in human detection.

In image determination processing pertaining to the present embodiment, first, in order to obtain face detection results and human detection results to be used in the image determination processing, the face detection circuit 2 and the human detection circuit 3 are respectively caused to execute the face detection as illustrated in FIG. 2 and the human detection as illustrated in FIG. 3 in advance. Here, note that the face detection and the human detection may be executed in parallel or on a one-by-one basis. Further, when performing the face detection and the human detection one by one, no limitation is imposed as for the order in which the two types of detection are executed. Here, similar as in embodiment 4, the face detection is performed by using, as the face detection parameter (the value compared with the evaluation value) applied as a search condition when determining whether or not a search region includes a face image, a smaller value (Thf1) compared to a value used in a structure where a focus point search region is determined by performing face detection on an individual basis. The use of such a relatively small value as the face detection parameter allows detection of an increased number of face regions. Similarly, the human detection is performed by using, as the human detection parameter applied as a search condition when determining whether or not a search region includes a human image, a smaller value (Thh1) compared to a value used in a structure where a focus point search region is determined by performing human detection on an individual basis. The use of such a relatively small value as the human detection parameter allows detection of an increased number of human regions. When setting relatively small values as threshold values applied as search conditions, the robustness of the search is enhanced and changes in the direction in which faces/people face are tolerated to a greater extent. This results in an increase in the number of detection results obtained as a result of the search. However, at the same time, regions are also detected which do not actually include faces/people (i.e., the erroneous detection as described above occurs), and hence non-accurate detection results are obtained through the search.

The processor 4, by executing a program including programming language description of the aggregation processing as illustrated in FIG. 18 with respect to the face detection results and the human detection results obtained in the above-described manner, causes a combination of the face detection circuit 2, the human detection circuit 3, and the processor 4 to function as a search unit that searches, in a captured image, for a set of an entire body image region corresponding to an entirety of a person's body and a partial image region that corresponds to a predetermined body part of the same person.

Here, in Step S503 in the aggregation processing in FIG. 18, a position and a size in a human detection result are respectively converted into a face-corresponding portion position and a face-corresponding portion size by using predetermined information so as to make possible the comparison between the face detection results and the human detection results and the determination of which face regions and which human regions correspond to the same person, similar as in embodiment 1. When the above-described conversion is performed in embodiment 1, the learning image illustrated in FIG. 8 is used. However, in the present embodiment, since a relatively small value (the threshold value Thh1) is used as the human detection parameter in the human detection so as to increase the robustness of the human detection, a human region does not always include an image of a person in an upright posture as illustrated in FIG. 8.

Figure 21:
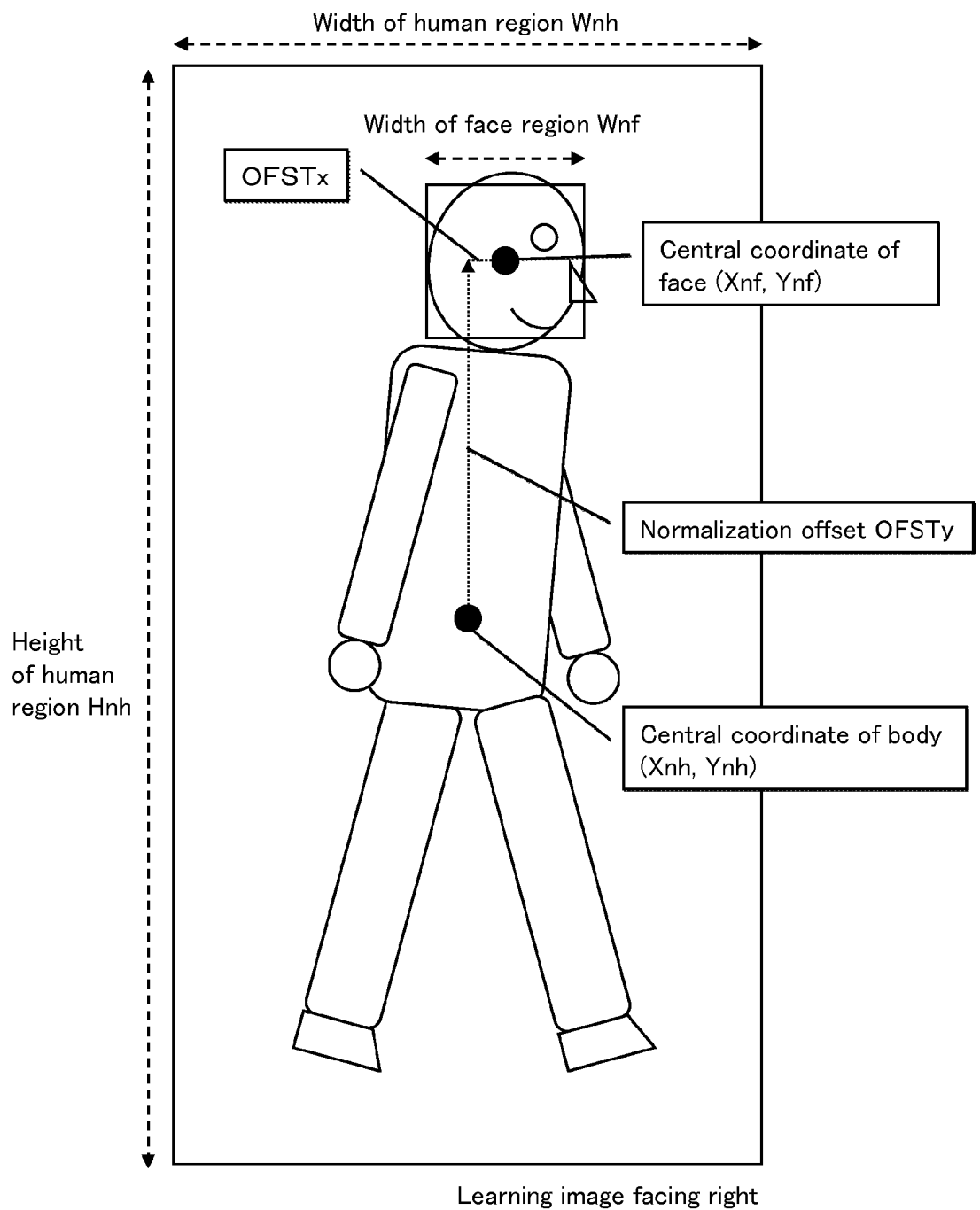
FIG. 21 illustrates an image of a person in a forward-bent posture.

That is, in the present embodiment, there are cases where a human region includes an image of a person in a forward-bent posture who is travelling in a direction indicated by the "direction/inclination" information included in a corresponding human detection result. As already described above, direction/inclination information included in a human detection result indicates a direction in which a person is facing, For instance, when a human image in a human region is (i) in a forward-bent posture, (ii) is facing towards the right, and (iii) running as illustrated in FIG. 21, the center position (Xnf, Ynf) of a face of the person can be assumed to be shifted towards the right in the horizontal direction compared to the position of the face portion in the learning image illustrated in FIG. 8 which indicates a person standing upright. When supposing that the width of the human region is equal to the width Wnh of the human region in the normalized image illustrated in FIG. 8, an offset amount indicating a movement amount in the vertical direction in such a case is denoted as OFSTx. As such, the movement amount of the center position of the face in the vertical direction, per unit width of the human region, is calculated by OFSTx/Wnh.

Based on the above, in the present embodiment, the face-corresponding portion position obtained as a result of converting a position of a human region by using the learning image is corrected by using direction information obtained from the human detection result. In specific, among components of the central coordinate (Xf, Yf) of the face-corresponding portion position calculated in Step S503, the Y-direction component Yf is calculated in a similar manner as in embodiment 1, but the X-direction component Xf is calculated in a different manner from embodiment 1. That is, when the central coordinate of the human region having been detected is denoted as (Xh, Yh) as illustrated in FIG. 7, the X-direction component Xf is calculated according to Formula 10 when the "direction/inclination" information in the human detection result indicates "right", and is calculated according to Formula 11 when the "direction/inclination" information of the human detection result indicates "left".

$$Xf = Xh + Wh \times (OFSTx/Wnh) \quad \text{Formula 10}$$

$$Xf = Xh - Wh \times (OFSTx/Wnh) \quad \text{Formula 11}$$

By calculating the central coordinate (Xf, Yf) of the face-corresponding portion position of the person having been detected in the human detection according to the "direction/inclination" information included in the human detection result as illustrated above, the comparison and determination of whether a given face region and a given human region indicate the same person can be performed accurately.

Further, it may be considered to determine a magnitude of the offset amount OFSTx based on a speed of movement of a person. When determining the magnitude of the offset amount OFSTx based on a speed of movement of a person included in the human region, calculation is performed of the speed of movement of the person by utilizing the motion estimation unit 5, etc. Further, in such a case, a relatively great amount is to be set to the offset amount OFSTx based on the assumption that the person is bent further forwards in the direction of movement when the movement speed is relatively great, whereas a relatively small amount is to be set to the offset amount OFSTx when the movement speed is relatively small. Further, in such a case, a value "0" may be set to the offset amount OFSTx when the movement speed indicates a slow speed of a certain level. This is since, when a person is walking, the degree to which the person's body is bent forward does not reach the degree referred to as a forward-bent posture.

After the processing in Step S503 is executed as described above, the processor 4, which functions as a search unit by executing the processing in Steps S506 through S509, determines whether or not a combination of the face detection circuit 2 and the human detection circuit 3 has detected a set of an entire body image region and a face image region, and further, classifies face detection results and human detection results having been obtained into groups. Here, as described above, the face detection results are obtained by using the threshold value Thf1 and the human detection results are obtained by using the threshold value Thh1. Following this point, similar as in embodiment 4, the processor 4 executes the redetermination processing as illustrated in FIG. 19.

In Step S601 illustrated in FIG. 19, a different value is set as the face detection parameter used for performing the redetermination according to whether or not the combination of the face detection circuit 2 and the human detection circuit 3 has detected a set of an entire body image region and a face image region corresponding to the same person. Note that, in embodiment 4, the face detection parameter used in Step S601 for the redetermination of a face detection result included in a group that does not include a human detection result is changed to a greater value than the threshold value used in the initial determination in the face detection performed prior to the aggregation of detection results of whether a search region corresponds to a face. Further, in embodiment 4, the face detection parameter used in Step S601 for the redetermination of whether or not a face detection result included in a group that also includes a human detection result is not changed from the threshold value used in the initial determination.

However, in the present embodiment, the face detection parameter used in Step S601 for the redetermination of a face detection result included in a group that also includes a human detection result is changed to a greater value (Thf2) from the threshold value (Thf1) used in the initial determination in the face detection. By performing the redetermination by using a value Thf2 that is greater than the relatively low threshold value Th1 used in the initial determination performed prior to the aggregation of detection results, erroneously detection results having been obtained in the initial determination by using the relatively low threshold value Th1, which was used for the purpose of improving robustness of the face detection, are eliminated. In addition, in the present embodiment, the face detection parameter used in Step S601 for the redetermination of a face detection result included in a group that does not include a human detection result is changed to an even greater value (Thf3) than the threshold value Thf2.

In the following, description is provided on specific examples of the redetermination results obtained in the present embodiment by using the above-described face detection parameters, with reference to the example illustrated in FIGS. 22A and 22B. In this example, "3" is set as the value of the face detection parameter Thf1 used in the initial determination in the face detection, and further, "5" is set as the value of the face detection parameter Thf2 used in the redetermination of a face detection result in a group that also includes a human detection result in the aggregated detection results. Further, "7" is set as the value of the face detection parameter Thf3 used in the redetermination of a face detection result in a group that does not include a human detection result in the aggregated detection results. When aggregating face detection results and human detection results obtained by using the face detection parameter "3" in the example illustrated in FIG. 21A, the lowermost table in FIG. 21B is obtained. The redetermination of the face detection results is performed based on the lowermost table in FIG. 22B. First, the aggregated detection results in "group 0" include a human detection result in addition to a face detection result. As such, the face detection parameter of "5" is used for the redetermination of the face image. When performing the redetermination, comparison is performed between an evaluation value in the face detection result and the face detection parameter, which results in a determination being made that a face image is detected. As such, the result of the redetermination is "face detected (1)", which is the same result as the initial determination. Subsequently, the aggregated detection results in "group 1" include a human detection result in addition to a face detection result. As such, the face detection parameter of "5" is used for the redetermination of the image in the face region, similar as in the case of "group 0". Here, an evaluation value corresponding to the face detection result in "group 1" is "4". As such, when the redetermination is performed, comparison is performed between the evaluation value in the face detection result and the face detection parameter, which results in a determination being made that a face image is in fact not detected. As such, in the lowermost table in FIG. 21B, the determination result of the initial determination is overwritten with the redetermination result of "face not detected (0)". Finally, "group 2" includes a face detection result but does not include a human detection result. As such, the face detection parameter of "7" is used for the redetermination. Here, an evaluation value corresponding to the face detection result in "group 2" is "3". As such, when the redetermination is performed, the determination result of the initial determination is overwritten with the redetermination result of "face not detected (0)".

Figure 23:
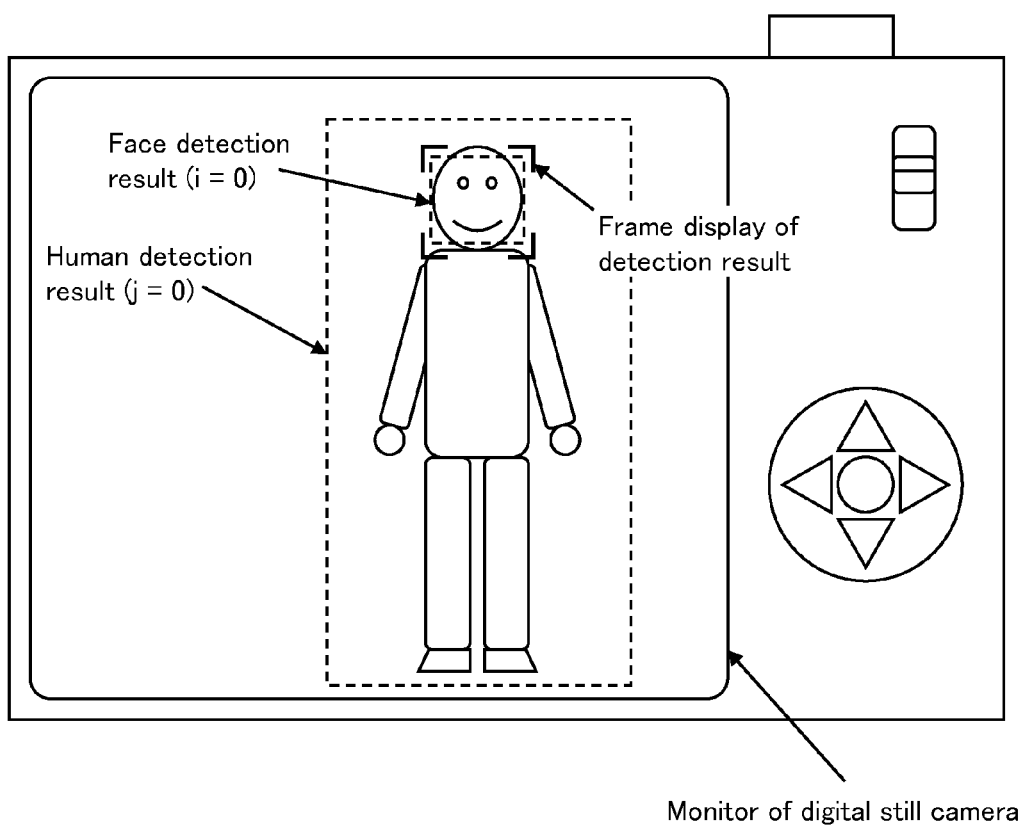
FIG. 23 illustrates one example of a displayed frame indicating a result of redetermination of a face image in embodiment 5.

When the redetermination of the face detection results have been performed as described above, in the present embodiment, the LCD output circuit 8 overlays and displays, on the captured image displayed on the LCD 16, a frame image corresponding to "group 0", whose redetermination result indicates "face detected (1)", as illustrated in FIG. 23. In specific, the frame image has a position and a size corresponding to the position and the size of the face region corresponding to the face detection result in "group 0".

This concludes the detailed description on the image determination processing pertaining to the present embodiment. It is desirable that the image determination processing as described above be performed each time a captured image is read in. According to the above-described structure, by combining face detection results and human detection results, the accuracy and the robustness of the face detection is improved while it is ensured that the occurrence of erroneous detection is suppressed. Such an improvement in the accuracy of the face detection leads to the setting of the focus point search region being performed with an increased degree of stability, and further, leads to unstable focus control being suppressed.

In the present embodiment, the redetermination is performed with respect to evaluation values in face detection results so as to suppress the occurrence of erroneous detection. However, in another embodiment of the present invention, the redetermination may be performed with respect to evaluation values in human detection results so as to suppress the occurrence of erroneous detection. When employing such a structure, a value Thh2, which is greater than the value Thh1 used in the initial determination in the human detection of whether or not a search region corresponds to a person and which enables accurately performing the human detection, is used as the human detection parameter in the redetermination of evaluation values in human detection results. Alternatively, the redetermination may be performed with respect to both evaluation values in face detection results and evaluation values in human detection results.

Further, in the present embodiment, the face detection parameter is changed after the aggregation of detection results is performed, and redetermination is only performed with respect to evaluation values corresponding to face detection results. However, the redetermination is not limited to being performed after the aggregation with respect to evaluation values having been set in advance, and in another embodiment of the present invention, the entire face detection may be executed once again after the aggregation by using a newly-set face detection parameter.

(Other Modifications)

In the above, description has been provided on the present invention while referring to several exemplary embodiments thereof. However, the present invention should not be construed as being limited to such embodiments. Such modifications as presented in the following may be made without departing from the spirit and scope of the present invention.

(1) The present invention may be implemented as an image capture device control method which is disclosed through the processing procedures illustrated in the flowcharts and also described in the embodiments. Alternatively, the present invention may be implemented as a computer program comprising program codes for causing a computer to operate according to the above-described processing procedures, or may be implemented as a digital signal comprising the computer program.

Further, the present invention may also be a computer-readable recording medium having recorded thereon the above-mentioned computer program or digital signal. Examples of such a recording medium include a flexible disk, hard disk, CD-ROM, MO, DVD, DVD-ROM, DVD-RAM, BD (Blu-ray Disc), and semiconductor memory.

In addition, the present invention may also be the computer program or digital signal to be transmitted via networks, of which telecommunications networks, wire/wireless communications networks, and the Internet are representative.

Alternatively, another independent computer system may implement the computer program or digital signal after the computer program or digital signal is transferred via being recorded on the recording medium. Also, in the present invention, another independent computer system may implement the computer program or digital signal after the computer program or digital signal is transferred via one of the above-mentioned networks, etc.

(2) The present invention may be implemented as a LSI that controls the image capture device disclosed in each of the above-described embodiments. Such an LSI is realized by integrating functional blocks included in an integrated circuit 50 illustrated in FIG. 1. Such functional blocks may be separately integrated into a single chip, or may be integrated into a single chip including a part or all of such functional blocks.

Although description has been made on the basis of an LSI in the above, the name of the integrated circuit may differ according to the degree of integration of the chips. Other integrated circuits include an IC (integrated circuit), a system LSI, a super LSI, and an ultra LSI.

Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI, reconfiguration of which could be made to the connection of internal circuit cells and settings.

Further in addition, if a new technology of circuit integration replacing that of the LSI emerges as a result of the progress made in the field of semiconductor technology or another technology deriving therefrom, the integration of function blocks may be performed applying such technology. At this point, there is a possibility of biotechnology being applied to induce the future development of circuit integration technology.

(4) The image capture device pertaining to the present embodiment is not limited to a digital still camera, and may be a digital video camera, etc.

(5) In the above-described embodiments, description has been provided on a case where only one among multiple candidate focus point search regions is selected and used as a focus point search region. However, the present invention is not limited to this, and one or more candidate focus point search regions, or two candidate focus regions to provide an example, may be selected as focus point search regions, and further, a focus point may be searched within a captured image by using contrast values obtained from the two focus point search regions.

(6) The present invention may be any possible combination of the above-described embodiments and modifications.

INDUSTRIAL APPLICABILITY

The image capture device pertaining to the present invention realizes stable focus control when used for shooting an image of a person, and thus, is useful as a digital still camera, etc. In addition, the image capture device pertaining to the present invention is also applicable as a video camera, a security camera, etc.

REFERENCE SIGNS LIST 1 image capture device
2 face detection circuit
3 human detection circuit
4 processor
5 motion estimation circuit
6 audio processing unit
7 image encoding circuit
8 LCD output circuit
9 image input circuit
10 focus drive unit
11 aperture drive unit
12 internal I/O bus
13 memory bus
14 flash memory
15 image memory
16 LCD
17 A/D converter
18 imaging sensor
19 aperture
20 focus lens
21 angle sensor
50 integrated circuit

The invention claimed is:

1. An image determination device that searches for an image of a person in a captured image, comprising:
   a search unit that searches for a set of a first region and a second region in the captured image according to a predetermined search condition, the first region potentially including an image of an entire body of the person and the second region potentially including an image of a predetermined body part of the person; and
   a determination unit that determines whether or not the search by the search unit is successful, wherein
   the search according to the predetermined search condition by the search unit, for detecting each of the first region and the second region in the captured image, comprises: dividing the captured image into a plurality of search regions by using a window; calculating an evaluation value for each of the search regions; and performing a first comparison, for each of the search regions, of comparing the evaluation value with a threshold value,
   the determination unit determines whether or not the search by the search unit is successful according to a result of the first comparison performed for each of the search regions, and
   when the determination unit determines that the search by the search unit is successful, the search unit performs a second comparison of comparing the evaluation value for at least one of the first region and the second region found through the search by the search unit and pertaining to the same person with a threshold value differing from the threshold value used in the first comparison, the search unit, by performing the second comparison, determining whether or not the at least one of the first region, which potentially includes the photographic object image, and the second region, which potentially includes the partial image, includes the corresponding image.

2. The image determination device of claim 1 further comprising:
   an imaging optical system;
   an imaging unit that generates the captured image by capturing an optical image formed by the imaging optical system;
   an image display unit that displays the captured image onto a display; and
   a determination result display unit that displays an image indicating the at least one of the first region and the second region, determined as including the corresponding image, so as to be overlaid onto the captured image displayed on the display.

3. A method for controlling an image capture device that searches for an image of a person in a captured image, the method comprising:
a search step of searching for a set of a first region and a second region in the captured image according to a predetermined search condition, the first region potentially including an image of an entire body of the person and the second region potentially including an image of a predetermined body part of the person; and
a determination step of determining whether or not the search according to the predetermined search condition is successful, wherein
the search according to the predetermined search condition in the search step, for detecting each of the first region and the second region in the captured image, comprises: dividing the captured image into a plurality of search regions by using a window; calculating an evaluation value for each of the search regions; and performing a first comparison, for each of the search regions, of comparing the evaluation value with a threshold value,
the determination step determines whether or not the search by the search step is successful according to a result of the first comparison performed for each of the search regions, and
when the determination step determines that the search in the search step is successful, the search step performs a second comparison of comparing the evaluation value for at least one of the first region and the second region found through the search according to the predetermined search condition and pertaining to the same person with a threshold value differing from the threshold value used in the first comparison, the search unit, by performing the second comparison, determining whether or not the at least one of the first region, which potentially includes the photographic object image, and the second region, which potentially includes the partial image, includes the corresponding image.

4. An integrated circuit forming an image capture device that searches for an image of a person in a captured image, the integrated circuit comprising:
a search unit that searches for a set of a first region and a second region in the captured image according to a predetermined search condition, the first region potentially including an image of an entire body of the person and the second region potentially including an image of a predetermined body part of the person; and
a determination unit that determines whether or not the search by the search unit is successful, wherein
the search according to the predetermined search condition by the search unit, for detecting each of the first region and the second region in the captured image, comprises: dividing the captured image into a plurality of search regions by using a window; calculating an evaluation value for each of the search regions; and performing a first comparison, for each of the search regions, of comparing the evaluation value with a threshold value,
the determination unit determines whether or not the search by the search unit is successful according to a result of the first comparison performed for each of the search regions, and
when the determination unit determines that the search by the search unit is successful, the search unit performs a second comparison of comparing the evaluation value for at least one of the first region and the second region found through the search by the search unit and pertaining to the same person with a threshold value differing from the threshold value used in the first comparison, the search unit, by performing the second comparison, determining whether or not the at least one of the first region, which potentially includes the photographic object image, and the second region, which potentially includes the partial image, includes the corresponding image.

5. An image capture device comprising:
an imaging optical system comprising a focus lens;
an imaging unit that captures an optical image formed by the imaging optical system;
a first search unit that sets a first search region in the captured image captured by the imaging unit, performs detection, in the first search region, of a partial image that corresponds to a predetermined part of a photographic object, and sets the first search region as a focus point search region in the captured image when the partial image is detected;
a second search unit that sets a second search region in the captured image, performs detection, in the second search region, of a photographic object image that corresponds to an entirety of a photographic object, and sets a plurality of candidate focus point search regions within the second search region when the photographic object image is detected, the candidate focus point search regions each being a region in the captured image that is a candidate of the focus point search region;
a determination unit that determines whether the partial image and the photographic object image pertain to a same person; and
a focus control unit that performs focus control with respect to the imaging optical system according to a contrast method by using contrast of the focus point search region, wherein
the detection by the first search unit and the detection by the second search unit each comprise: dividing the captured image into a plurality of search regions by using a window, calculating an evaluation value for each of the search regions, and performing a first comparison, for each of the search regions, of comparing the evaluation value with a threshold value, the search regions each corresponding to the first search region in the detection by the first search unit and each corresponding to the second search region in the detection by the second search unit,
when the determination unit determines that the partial image and the photographic object image pertain to the same person, at least one of the first search unit and the second search unit performs a second comparison, a threshold value used in the second comparison differing from the threshold value used in the first comparison, and
the focus control unit, when the partial image is not detected by the first search unit and the photographic object image is detected by the second search unit, sets one or more candidate focus point search regions each including a part of the photographic object corresponding to the photographic object image, among the plurality of candidate focus point search regions, as the focus point search region and uses the contrast of the focus point search region to perform the focus control.

6. The image capture device of claim 5, wherein
the partial image comprises an image of a person's face, and the photographic object image comprises an image of an entire body of a person or an image of an upper half of a person's body.

7. The image capture device of claim 6, wherein
the second search unit determines a direction in which a human image detected in the second search region is facing, and determines positions within the second search region at which the candidate focus point search regions are to be set according to the direction.

8. The image capture device of claim 6, wherein,
the second search unit determines a size of the candidate focus point search regions according to a size of a human image detected in the second search region as the photographic object image.

9. The image capture device of claim 6, wherein
when the partial image is not detected by the first search unit and the photographic object image is detected by the second search unit, the focus control unit sets, as the focus point search region, one candidate focus point search region having the shortest focal distance among the plurality of candidate focus point search regions.

10. The image capture device of claim 6, wherein
when the partial image is not detected by the first search unit and the photographic object image is detected by the second search unit, the focus control unit sets, as the focus point search region, one candidate focus point search region having the shortest focal distance from the image capture device among one or more candidate focus point search regions, among the plurality of candidate focus point search regions, that are located within a predetermined distance from one reference candidate focus point search region among the plurality of candidate focus point search regions.

11. The image capture device of claim 10, wherein
the one reference candidate focus point search region includes a central point of the second search region.

12. The image capture device of claim 6 further comprising
a receiving unit that receives a user operation of selecting at least one candidate focus point search region from among the plurality of candidate focus point search regions, wherein
when the partial image is not detected by the first search unit and the photographic object image is detected by the second search unit, the focus control unit, when performing the focus control, sets the at least one candidate focus point search region selected as a result of the user operation as the focus point search region.

13. The image capture device of claim 6 further comprising:
an image display unit that displays the captured image onto a display; and
a focus point search region display unit that displays the focus point search region, whose contrast is used in the focus control, so as to be overlaid onto the captured image displayed on the display.

14. The image capture device of claim 6 further comprising:
an aperture control unit that controls an aperture that the imaging optical system comprises, wherein
when the partial image is not detected by the first search unit and the photographic object image is detected by the second search unit, the aperture control unit controls an aperture amount of the aperture such that focal distances of all of the candidate focus point search regions set by the second search unit are included within a depth of field.

15. A method of controlling focusing in an image capture device comprising: an imaging optical system that comprises a focus lens and an imaging unit that captures an optical image formed by the imaging optical system, the method comprising:
a first search step of setting a first search region in the captured image captured by the imaging unit, performing detection, in the first search region, of a partial image that corresponds to a predetermined part of a photographic object, and setting the first search region as a focus point search region in the captured image when the partial image is detected;
a second search step of setting a second search region in the captured image, performing detection, in the second search region, of a photographic object image that corresponds to an entirety of a photographic object, and setting a plurality of candidate focus point search regions within the second search region when the photographic object image is detected, the candidate focus point search regions each being a region in the captured image that is a candidate of the focus point search region;
a determination step of determining whether the partial image and the photographic object image pertain to a same person; and
a focus control step of
performing focus control with respect to the imaging optical system according to a contrast method by using contrast of the focus point search region set by the first search step when the partial image is detected by the first search step, and
setting one or more candidate focus point search regions each including a part of the photographic object corresponding to the photographic object image, among the plurality of candidate focus point search regions set by the second search step, as the focus point search region and performing focus control with respect to the imaging optical system according to the contrast method by using contrast of the one or more candidate focus point regions having been set as the focus point region when the partial image is not detected by the first search step and the photographic object image is detected by the second search step, wherein
the detection by the first search step and the detection by the second search step each comprise: dividing the captured image into a plurality of search regions by using a window; calculating an evaluation value for each of the search regions; and performing a first comparison, for each of the search regions, of comparing the evaluation value with a threshold value, the search regions each corresponding to the first search region in the detection by the first search step and each corresponding to the second search region in the detection by the second search step, and
when the determination step determines that the partial image and the photographic object image pertain to the same person, at least one of the first search step and the second search step performs a second comparison, a threshold value used in the second comparison differing from the threshold value used in the first comparison.

16. An integrated circuit used for controlling focusing in an image capture device comprising: an imaging optical system that comprises a focus lens and an imaging unit that captures an optical image formed by the imaging optical system, the integrated circuit comprising:
a first search unit that sets a first search region in the captured image captured by the imaging unit, performs detection, in the first search region, of a partial image that corresponds to a predetermined part of a photographic object, and sets the first search region as a focus point search region in the captured image when the partial image is detected;

a second search unit that sets a second search region in the captured image, performs detection, in the second search region, of a photographic object image that corresponds to an entirety of a photographic object, and sets a plurality of candidate focus point search regions within the second search region when the photographic object image is detected, the candidate focus point search regions each being a region in the captured image that is a candidate of the focus point search region;

a determination unit that determines whether the partial image and the photographic object image pertain to a same person; and a focus control unit that performs focus control with respect to the imaging optical system according to a contrast method by using contrast of the focus point search region, wherein the detection by the first search unit and the detection by the second search unit each comprise: dividing the captured image into a plurality of search regions by using a window, calculating an evaluation value for each of the search regions, and performing a first comparison, for each of the search regions, of comparing the evaluation value with a threshold value, the search regions each corresponding to the first search region in the detection by the first search unit and each corresponding to the second search region in the detection by the second search unit, when the determination unit determines that the partial image and the photographic object image pertain to the same person, at least one of the first search unit and the second search unit performs a second comparison, a threshold value used in the second comparison differing from the threshold value used in the first comparison, and the focus control unit, when the partial image is not detected by the first search unit and the photographic object image is detected by the second search unit, sets one or more candidate focus point search regions each including a part of the photographic object corresponding to the photographic object image, among the plurality of candidate focus point search regions, as the focus point search region and uses the contrast of the focus point search region to perform the focus control.

* * * * *